(12) United States Patent
Paik et al.

(10) Patent No.: US 10,740,880 B2
(45) Date of Patent: Aug. 11, 2020

(54) SYSTEMS AND METHODS FOR ANALYZING PATHOLOGIES UTILIZING QUANTITATIVE IMAGING

(71) Applicant: ELUCID BIOIMAGING INC., Boston, MA (US)

(72) Inventors: David S. Paik, Half Moon Bay, CA (US); Andrew J. Buckler, Wenham, MA (US); Kjell Johnson, Ann Arbor, MI (US); Xiaonan Ma, South Hamilton, MA (US); Keith A. Moulton, Amesbury, MA (US)

(73) Assignee: ELUCID BIOIMAGING INC., Boston, MA (US)

( * ) Notice: Subject to any disclaimer, the term of this patent is extended or adjusted under 35 U.S.C. 154(b) by 125 days.

(21) Appl. No.: 15/874,474

(22) Filed: Jan. 18, 2018

(65) Prior Publication Data

US 2018/0330477 A1    Nov. 15, 2018

Related U.S. Application Data

(60) Provisional application No. 62/447,457, filed on Jan. 18, 2017.

(51) Int. Cl.
*G06T 5/00* (2006.01)
*G06T 7/136* (2017.01)
(Continued)

(52) U.S. Cl.
CPC .............. *G06T 5/003* (2013.01); *G06K 9/34* (2013.01); *G06K 9/4647* (2013.01); *G06K 9/621* (2013.01);
(Continued)

(58) Field of Classification Search
CPC ......... G06T 5/003; G06T 7/136; G06T 7/194; G06T 7/143; G06T 7/11; G06K 9/34; G06K 9/4647; G06K 9/62
See application file for complete search history.

(56) References Cited

U.S. PATENT DOCUMENTS 6,108,635 A    8/2000 Herren et al.
6,245,016 B1 *  6/2001 Daft ................... G01S 7/52026
                                               600/443
(Continued)

FOREIGN PATENT DOCUMENTS

WO        2015058151 A2    4/2015

OTHER PUBLICATIONS

Chan, Tony F "Variational Image Deblurring—a Window into Mathematical Image Processing" (Year: 2004).*

(Continued)

*Primary Examiner* — Kim Y Vu
*Assistant Examiner* — Molly Delaney
(74) *Attorney, Agent, or Firm* — Pearl Cohen Zedek Latzer Baratz LLP

(57) ABSTRACT

The present disclosure provides for improved image analysis via novel deblurring and segmentation techniques of image data. These techniques advantageously account for and incorporate segmentation of biological analytes into a deblurring process for an image. Thus, the deblurring of the image may advantageously be optimized for enabling identification and quantitative analysis of one or more biological analytes based on underlying biological models for those analytes. The techniques described herein provide for significant improvements in the image deblurring and segmentation process which reduces signal noise and improves the accuracy of the image. In particular, the system and methods described herein advantageously utilize unique optimization (Continued)

and tissue characteristics image models which are informed by the underlying biology being analyzed, (for example by a biological model for the analytes). This provides for targeted deblurring and segmentation which is optimized for the applied image analytics.

49 Claims, 5 Drawing Sheets

(51) Int. Cl.
   G06T 7/11       (2017.01)
   G06T 7/194      (2017.01)
   G06T 7/00       (2017.01)
   G06K 9/46       (2006.01)
   G06K 9/62       (2006.01)
   G06K 9/34       (2006.01)
   G06T 7/143      (2017.01)

(52) U.S. Cl.
   CPC ............. *G06T 7/0012* (2013.01); *G06T 7/11* (2017.01); *G06T 7/136* (2017.01); *G06T 7/143* (2017.01); *G06T 7/194* (2017.01); *G06K 2209/05* (2013.01); *G06T 2207/10072* (2013.01); *G06T 2207/10081* (2013.01); *G06T 2207/10088* (2013.01); *G06T 2207/10132* (2013.01); *G06T 2207/20036* (2013.01); *G06T 2207/20076* (2013.01); *G06T 2207/20081* (2013.01); *G06T 2207/20152* (2013.01); *G06T 2207/20161* (2013.01); *G06T 2207/30024* (2013.01); *G06T 2207/30096* (2013.01); *G06T 2207/30101* (2013.01)

(56) References Cited

U.S. PATENT DOCUMENTS

| | | | |
|---|---|---|---|
| 8,879,813 B1* | 11/2014 | Solanki | G16H 30/20 382/128 |
| 9,858,529 B2* | 1/2018 | Adams | G06N 7/005 |
| 2002/0103776 A1 | 8/2002 | Bella et al. | |
| 2003/0105638 A1 | 6/2003 | Taira | |
| 2005/0043614 A1 | 2/2005 | Huizenga et al. | |
| 2005/0118632 A1 | 6/2005 | Chen et al. | |
| 2006/0242288 A1 | 10/2006 | Masurkar | |
| 2007/0130206 A1 | 6/2007 | Zhou et al. | |
| 2007/0208516 A1 | 9/2007 | Kutsyy | |
| 2008/0027695 A1 | 1/2008 | Balgi et al. | |
| 2008/0201280 A1 | 8/2008 | Martin | |
| 2009/0171871 A1 | 7/2009 | Zhang et al. | |
| 2009/0258925 A1 | 10/2009 | Wahlestedt | |
| 2009/0259459 A1 | 10/2009 | Ceusters et al. | |
| 2009/0324126 A1 | 12/2009 | Zitnick et al. | |
| 2010/0070448 A1 | 3/2010 | Omoigui | |
| 2010/0262545 A1 | 10/2010 | Herlitz | |
| 2011/0026798 A1* | 2/2011 | Madabhushi | G01R 33/56 382/131 |
| 2011/0027181 A1 | 2/2011 | Amodei et al. | |
| 2012/0278060 A1 | 11/2012 | Cancedda et al. | |
| 2013/0275094 A1 | 10/2013 | Ortoleva | |
| 2014/0126770 A1 | 5/2014 | Odessky | |
| 2014/0270440 A1* | 9/2014 | Inglese | A61B 6/4241 382/131 |
| 2014/0365239 A1 | 12/2014 | Sadeghi | |
| 2015/0154275 A1 | 6/2015 | Senart | |
| 2015/0234921 A1 | 8/2015 | Li | |
| 2015/0272467 A1* | 10/2015 | Warfield | A61B 5/055 382/131 |
| 2015/0324527 A1 | 11/2015 | Siegel et al. | |
| 2016/0042508 A1* | 2/2016 | Novikov | A61B 5/0042 382/131 |
| 2016/0097716 A1* | 4/2016 | Gulati | A61B 5/02416 250/339.01 |
| 2016/0203599 A1 | 7/2016 | Gillies | |
| 2016/0314580 A1 | 10/2016 | Lloyd et al. | |
| 2016/0326588 A1 | 11/2016 | Beier | |
| 2016/0364630 A1 | 12/2016 | Reicher et al. | |
| 2017/0358079 A1 | 12/2017 | Gillies et al. | |
| 2018/0321347 A1* | 11/2018 | Wang | G01R 33/5608 |
| 2019/0019300 A1* | 1/2019 | Simpson | G06K 9/46 |

OTHER PUBLICATIONS

Shen, Jianghong, Chan, Tony F. "Variational PDE Models in Image Processing" (Year: 2003).*

Goatman, Keith A. "Detection of New Vessels on the Optic Disc Using Retinal Photographs" IEEE Transactions on Medical Imaging vol. 30, No. 4 (Year: 2011).*

"Eye tracking in advertising research—Tobii Pro", downloaded from https://www.tobiipro.com/fields-of-use/marketing-consumer-research/advertising/, retrieved on Oct. 10, 2017, 14 pages.

"MIT Saliency Benchmark", retrieved from http://saliency.mit.edu/results _ mit300.html, downloaded on Oct. 10, 2017, 17 pages.

"SalNet: Deep Convolutional Networks for Saliency Prediction", retrieved from https://algorithmia.com/algorithms/deeplearning/SalNet, downloaded on Oct. 10, 2017, 4 pages.

Bylinskii, et al., "Learning Visual Importance for Graphic Designs and Data Visualizations", Proceedings of the 30th Annual ACM Symposium on User Interface Software & Technology (UIST '17), http://dx.doi.org/10.1145/3126594.3126653, Aug. 8, 2017, 13 pages.

Jahanian, et al., "Recommendation System for Automatic Design of Magazine Covers", Proceedings of the 2013 International Conference on Intelligent User Interfaces (IUI '13), DOI: https://doi.org/10.1145/2449396.2449411, Mar. 2013, New York, NY, pp. 95-106.

Krafka, et al., "Eye tracking for Everyone", Proceedings of the IEEE Conference on Computer Vision and Pattern Recognition, 2016, 9 pages.

Liu, et al., "Predicting Eye Fixations using Convolutional Neural Networks", Proceedings of the IEEE Conference on Computer Vision and Pattern Recognition, 2015, 9 pages.

Ma, et al., "Advertisement evaluation using visual saliency based on foveated image", Multimedia and Expo, 2009, ICME 2009, IEEE International Conference on. IEEE, 2009, 4 pages.

Pan, et al., "Shallow and Deep Convolutional Networks for Saliency Prediction", Proceedings of the IEEE Conference on Computer Vision and Pattern Recognition, Mar. 2, 2016, pp. 1-10.

Wadhwa, Tarun , "Eye-Tracking Technologies Are About to Make Advertising Even More Invasive", retrieved from https://www.forbes.com/sites/tarunwadhwa/2013/05/08/with-recent-advances-in-eye-tracking-advertising-set-to-become-even-more-invasive, Forbes, May 8, 2013, 4 pages.

Li, et al., "Webpage saliency prediction with multi-features fusion," Image Processing (ICIP), 2016 IEEE International Conference on. IEEE, 2016, 5 pages.

Still, et al., "A saliency model predicts fixations in web interfaces," 5th International Workshop on Model Driven Development of Advanced User Interfaces (MDDAUI 2010), Apr. 2010, 5 pages.

Xu, et al., "Spatio-temporal modeling and prediction of visual attention in graphical user interfaces," Proceedings of the 2016 CHI Conference on Human Factors in Computing Systems, May 2016, 12 pages.

Roller, Colleen, "Using Salience to Guide User Decision-Making," retrieved from https://uxmag.com/articles/using-salience-to-guide-user-decision-making, UX Magazine, Article No. 795, Mar. 2012, 9 pages.

Mannelli, L., et al., Changes in measured size of atherosclerotic plaque calcifications in dual-energy CT of ex vivo carotid endarterectomy specimens: effect of monochromatic keV image reconstructions. European radiology, 2013. 23(2): p. 367-374.

Marwick TH, C.I., Hartaigh B, Min JK, Finding the Gatekeeper to the Cardiac Catheterization Laboratory Coronary CT Angiography or Stress Testing? Journal of the American College of Cardiology (JACC), 2015.65(25): p. 10.

May, J.M., et al., Low-Risk Patients With Chest Pain in the Emergency Department: Negative 64-MDCT Coronary Angiography

(56) References Cited

OTHER PUBLICATIONS

May Reduce Length of Stay and Hospital Charges. American Journal of Roentgenology, 2009. 193(1): p. 150-154.

Meijboom, W.B., et al., Comprehensive assessment of coronary artery stenoses: computed tomography coronary angiography versus conventional coronary angiography and correlation with fractional flow reserve in patients with stable angina. Journal of the American College of Cardiology, 2008. 52(8): p. 636-643.

Melander, O., et al., Novel and conventional biomarkers for prediction of incident cardiovascular events in the community. JAMA : the journal of the American Medical Association, 2009. 302(1): p. 49-57.

Melikian, N., et al., Fractional flow reserve and myocardial perfusion imaging in patients with angiographic multivessel coronary artery disease. JACC: Cardiovascular Interventions, 2010. 3(3): p. 307-314.

Miao, C., et al., Positive Remodeling of the Coronary Arteries Detected by Magnetic Resonance Imaging in an Asymptomatic Population: MESA (Multi-Ethnic Study of Atherosclerosis). J Am Coll Cardiol, 2009. 53(18): p. 1708-1715.

Miao, C., et al., The Association of Pericardial Fat with Coronary Artery Plaque Index at MR Imaging: The Multi-Ethnic Study of Atherosclerosis (MESA). Radiology, 2011. 261(1): p. 109-115.

Min, J.K., et al., Diagnostic accuracy of fractional flow reserve from anatomic CT angiography. JAMA, 2012. 308(12): p. 1237-45.

Min, J.K., Y. Chandrashekhar, and J. Narula, Noninvasive FFR After STEMI Looking for the Guilty Bystander. JACC Cardiovasc Imaging, 2017. 10(4): p. 500-502.

Min, J.K., Y. Chandrashekhar, and J. Narula, The Immediate Effects of Statins on Coronary Atherosclerosis: Can Phenotype Explain Outcome? JACC Cardiovasc Imaging, 2017.

Mono, M.L., et al., Plaque Characteristics of Asymptomatic Carotid Stenosis and Risk of Stroke. Cerebrovascular Diseases, 2012. 34(5-6): p. 343-350.

Moschetti, K., et al., Comparative cost-effectiveness analyses of cardiovascular magnetic resonance and coronary angiography combined with fractional flow reserve for the diagnosis of coronary artery disease. Journal of Cardiovascular Magnetic Resonance, 2014. 16(1): p. 13.

Moss AJ, W.M., Newby DE, Nicol ED. The Updated NICE Guidelines: Cardc CT as the First-Line Test for Coronary Artery Disease. Curr Cardiovasc Imaging Rep., 2017. 10(5): p. 5.

Motoyama, S., et al., Computed tomographic angiography characteristics of atherosclerotic plaques subsequently resulting in acute coronary syndrome. Journal of the American College of Cardiology, 2009. 54(1): p. 49-57.

Motoyama, S., et al., Morphologic and Functional Assessment of Coronary Artery Disease; Potential Application of Compuled Tomography Angiography and Myocardial Perfusion Imaging. Circulation Journal, 2013. 77(2): p. 411-417.

Motoyama, S., et al., Multislice computed tomographic characteristics of coronary lesions in acute coronary syndromes. J Am Coll Cardiol, 2007. 50(4): p. 319-26.

Motoyama, S., et al., Plaque characterization by coronary computed tomography angiogaphy and the likelihood of acute coronary events in mid-term follow-up. Journal of the Amean College of Cardiology, 2015. 66(4): p. 337-346.

Mozley et al. "Change in Lung Tumor Volume as a Biomarker of Treatment Response: A Critical Review of the Evidence." Ann. Oncol. 21.9(2010):1751-1755.

Muntendam, P., et al., The BioImage Study: Novel approaches to risk assessment in the primary prevention of atherosclerotic cardiovascular disease—study design and objectives. Am Heart J, 2010. 160(1): p. 49-57.e1.

Nair, A., et al., Coronary Plaque Classification With Intravascular Ultrasound Radiofrequency Data Analysis. Circulation, 2002. 106(17): p. 2200-2206.

Nakanishi, R. and M.J. Budoff, Noninvasive FFR derived from coronary CT angiography in the management of coronary artery disease: technology and clinical update. Vascular health and risk management, 2016. 12: p. 269.

Narula, J., et al., Histopathologic characteristics of atherosclerotic coronary disease and implications of the findings for the invasive and noninvasive detection of vulnerable plaques. Journal of the American College of Cardiology, 2013. 61(10): p. 1041-1051.

Naylor, A.R., Identifying the high-risk carotid plaque. The Journal of Cardiovascular Surgery, 2014. 55(2): p. 11-20.

Nissen, S.E., The Vulnerable Plaque "Hypothesis": Promise, but Little Progress. JACC: Cardiovascular Imaging, 2009. 2(4): p. 483-485.

Nørgaard, B.L., et al., Diagnostic performance of noninvasive fractional flow reserve derived from coronary computed tomography angiography in suspected coronary artery disease: the NXT trial (Analysis of Coronary Blood Flow Using CT Angiography: Next Steps). J Am Coll Cardiol, 2014. 63(12): p. 1145-1155.

Obaid, D.R., et al., Atherosclerotic Plaque Composition and Classification Identified by Coronary Computed Tomography: Assessment of Computed Tomography-Generated Plaque Maps Compared With Virtual Histology Intravascular Ultrasound and Histology. Circulation: Cardiovascular Imaging, 2013: p. 655-664.

Obaid, D.R., et al., Dual-energy computed tomography imaging to determine atherosclerotic plaque composition: A prospective study with tissue validation. Journal of Cardiovascular Computed Tomography, 2014. 8(3): p. 230-237.

Obaid, D.R., et al., Identification of Coronary Plaque Sub-Types Using Virtual Histology Intravascular Ultrasound Is Affected by Inter-Observer Variability and Differences in Plaque Definitions. Circulation: Cardiovascular Imaging, 2012. 5(1): p. 86-93.

Oberoi, S., et al., Reproducibility of Noncalcified Coronary Artery Plaque Burden Quantification From Coronary CT Angiography Across Different Image Analysis Platforms. American Journal of Roentgenology, 2013. 202(1): p. W43-W49.

Oikawa, M., et al., Carotid magnetic resonance imaging. A window to study atherosclerosis and identify high-risk plaques. Circ J, 2009. 73(10): p. 1765-73.

Okubo, M., et al., Tissue Characterization of Coronary Plaques : Comparison of Integrated Backscatter Intravascular Ultrasound With Virtual Histology Intravascular Ultrasound. Circ J, 2008. 72(10): p. 1631-1639.

Ota, H., et al., Carotid intraplaque hemorrhage imaging at 3.0-T MR imaging: comparison of the diagnostic performance of three T1-weighted sequences. Radiology, 2010. 254(2): p. 551-63.

Ota, H., et al., Hemorrhage and large lipid-rich necrotic cores are independently associated with thin or ruptured fibrous caps: an in vivo 3T MRI study. Arterioscler Thromb Vasc Biol, 2009. 29(10): p. 1696-701.

Pandya, A., et al., Carotid Artery Stenosis: Cost-effectiveness of Assessment of Cerebrovascular Reserve to Guide Treatment of Asymptomatic Patients. Radiology, 2014. 274(2): p. 455-463.

Park, S.-J., et al., Visual-functional mismatch between coronary angiography and fractional flow reserve. JACC: Cardiovascular Interventions, 2012. 5(10): p. 1029-1036.

Parmer, J.P., et al., Magnetic Resonance Imaging of Carotid Atherosclerotic Plaque in Clinically Suspected Acute Transient Ischemic Attack and Acute Ischemic Stroke. Circulation, 2010. 122(20): p. 2031-2038.

Pearson, T.A., et al., Markers of Inflammation and Cardiovascular Disease: Application to Clinical and Public Health Practice: A Statement for Healthcare Professionals From the Centers for Disease Control and Prevention and the American Heart Association. Circulation, 2003. 107(3): p. 499-511.

Perera, R. and P. Nand, Recent Advances in Natural Language Generation: A Survey and Classification of the Empirical Literature. vol. 36. 2017. 1-31.

Perisic, L.M. and U. Hedin, Unstable Plaque: from patient to molecule to patient, in Cardiology. 2018, Karolinska Institutet: HLF Stora Forskningsanlaget.

Phinikaridou et al. "Regions of Low Endothelial Shear Stress Colocalize with Positive Vascular Remodeling and Atherosclerotic

(56) References Cited

OTHER PUBLICATIONS

Plaque Disruption: An in vivo Magnetic Resonance Imaging Study." Circ. Cardiovasc. Imaging. 6.2 (2013):302-310.

Pijils, N.H.J., B. de Bruyne, K. Peels, P.H. van der Voort, H.J.R.M. Bonnier, J. Bartunek, and J.J. Koolen, Measurement of Fractional Flow Reserve to Assess the Functional Severity of Coronary-Artery Stenoses. New England Journal of Medicine, 1996. 334(26): p. 1703-1708.

Pijls, N.H., et al., Fractional flow reserve versus angiography for guiding percutaneous coronary intervention in patients with multivessel coronary artery disease: 2-year follow-up of the FAME (Fractional Flow Reserve Versus Angiography for Multivessel Evaluation) study. Journal of the American College of Cardiology, 2010. 56(3): p. 177-184.

Pijls, N.H., et al., Percutaneous Coronary Intervention of Functionally Nonsignificant Stenosis 5-Year Follow-Up of the DEFER Study. JACC, 2007. 49(21): p. 2105-11.

Polak, J.F., et al., Carotid artery plaque and progression of coronary artery calcium: the multi-ethnic study of atherosclerosis. J Am Soc Echocardiogr, 2013. 26(5): p. 548-55.

Polonsky, T.S., et al., Coronary artery calcium score and risk classification for coronary heart disease prediction. JAMA, 2010. 303(16): p. 1610-1616.

Prentice, "Surrogate Endpoints in Clinical Trials: Definition and Operational Criteria." Stat. Med. 9(1989):431-440.

Prescott, J., Quantitative Imaging Biomarkers: The Application of Advanced Image Processing and Analysis to Clinical and Preclinical Decision Making. Journal of Digital Imaging, 2013. 26(1): p. 97-108.

Puchner, S.B., et al., High-Risk Plaque Detected on Coronary CT Angiography Predicts Acute Coronary Syndromes Independent of Significant Stenosis in Acute Chest Pain: Results From the ROMICAT-II Trial. J Am Coll Cardiol, 2014. 64(7): p. 684-692.

Puntmann, V.O., How-to guide on biomarkers: biomarker definitions, validation and applications with examples from cardiovascular disease. Postgraduate Medical Journal, 2009. 85(1008): p. 538-545.

Pyxaras, S.A., et al., Quantitative angiography and optical coherence tomography for the functional assessment of nonobstructive coronary stenoses: Comparison with fractional flow reserve. Am Heart J, 2013. 166(6): p. 1010-1018. e1.

Qiao, Y., et al., Carotid Plaque Neovascularization and Hemorrhage Detected by MR Imaging are Associated with Recent Cerebrovascular Ischemic Events. American Journal of Neuroradiology, 2012. 33(4): p. 755-760.

Qiao, Y., et al., Identification of atherosclerotic lipid deposits by diffusion-weighted imaging. Arterioscler Thromb Vasc Biol, 2007. 27(6): p. 1440-6.

Räber, L., et al., Effect of high-intensity statin therapy on atherosclerosis in non-infarct-related coronary arteries (IBIS-4): a serial intravascular ultrasonography study. Eur Heart J, 2014.

Raff, G.L., et al., Diagnostic Accuracy of Noninvasive Coronary Angiography Using 64-Slice Spiral Computed Tomography. J Am Coll Cardiol, 2005. 46(3): p. 552-557.

Reddy et al. "Confidence guided enhancing brain tumor segmentation in multi-parametric MRI" Proceedings of the 12th International Conference on Medical Image Computing and Computer-Assisted Intervention, MICCAI 2009, held in London, UK, Sep. 20, 2009.

Rinehart, S., et al., Quantitative measurements of coronary arterial stenosis, plaque geometry, and composition are highly reproducible with a standardized coronary arterial computed tomographic approach in high-quality CT datasets. Journal of Cardiovascular Computed Tomography, 2011. 5(1): p. 35-43.

Roes, S.D., et al., Aortic vessel wall magnetic resonance imaging at 3.0 Tesla: A reproducibility study of respiratory navigator gated free-breathing 3D black blood magnetic resonance imaging. Magnetic Resonance in Medicine, 2009. 61(1): p. 35-44.

Saam, T., et al., The vulnerable, or high-risk, atherosclerotic plaque: noninvasive MR imaging for characterization and assessment. Radiology, 2007. 244(1): p. 64-77.

Saba, L., et al., Carotid Artery Plaque Characterization Using CT Multienergy Imaging. American Journal of Neuroradiology, 2013. 34(4): p. 855-859.

Sadot, A., et al., Toward verified biological models. IEEE/ACM Trans Comput Biol Bioinform, 2008. 5(2): p. 223-34.

Sakuma, H., Coronary CT versus MR Angiography: The Role of MR Angiography. Radiology, 2011. 258(2): p. 340-349.

Salem, M.K., et al., Identification of Patients with a Histologically Unstable Carotid Plaque Using Ultrasonic Plaque Image Analysis. European Journal of Vascular and Endovascular Surgery, 2014. 48(2): p. 118-125.

Sanak, D., et al., The role of magnetic resonance imaging for acute ischemic stroke. Biomed Pap Med Fac Univ Palacky Olomouc Czech Repub, 2009. 153(3): p. 181-7.

Sargent et al. "Validation of Novel Imaging Methodologies for Use as Cancer Clinical Trial End-points." Eur. J. Dis. 45(2009):290-299.

Saur, S.C., et al., Contrast enhancement with dual energy CT for the assessment of atherosclerosis, in Bildverarbeitung für die Medizin 2009. 2009, Springer. p. 61-65.

Schaar, J.A., et al., Terminology for high-risk and vulnerable coronary artery plaques. Report of a meeting on the vulnerable plaque, Jun. 17 and 18, 2003, Santorini, Greece. Eur Heart J, 2004. 25(12): p. 1077-82.

Schepis, T., et al., Quantification of non-calcified coronary atherosclerotic plaques with dual-source computed tomography: comparison with intravascular ultrasound. Heart, 2010. 96(8): p. 610-615.

Schneeweis, C., et al., Delayed Contrast-Enhanced MRI of the Coronary Artery Wall in Takayasu Arteritis. PLoS One, 2012. 7(12): p. e50655.

Schuetz, G.M., et al., Meta-analysis: Noninvasive Coronary Angiography Using Computed Tomography Versus Magnetic Resonance Imaging. Ann Intern Med, 2010. 152(3): p. 167-177.

Scott, A.D., et al., Noninvasive detection of coronary artery wall thickening with age in healthy subjects using high resolution MRI with beat-to-beat respiratory motion correction. Journal of Magnetic Resonance Imaging, 2011. 34(4): p. 824-830.

Sheahan, M., et al., Atherosclerotic Plaque Tissue: Noninvasive Quantitative Assessment of Characteristics with Software-aided Measurements from Conventional CT Angiography. Radiology, 2017: p. 170127.

Silvera, S.S., et al., Multimodality imaging of atherosclerotic plaque activity and composition using FDG-PET/CT and MRI in carotid and femoral arteries. Atherosclerosis, 2009. 207(1): p. 139-43.

Sirimarco, G., et al., Carotid Atherosclerosis and Risk of Subsequent Coronary Event in Outpatients With Atherothrombosis. Stroke, 2013. 44(2): p. 373-379.

Sorger, P.K., Quantitative and systems pharmacology in the postgenomic era: New approaches to discovering drugs and understanding therapeutic mechanisms. QSP White Paper. 2011.

Spaan, J.A., et al., Physiological basis of clinically used coronary hemodynamic indices. Circulation, 2006. 113(3): p. 446-455.

St Pierre, S., et al., Measurement Accuracy of Atherosclerotic Plaque Structure on CT Using Phantoms to Establish Ground Truth. Acad Radiol, 2017(DOI 10.1016/j.acra.2017.04.007).

Stary, H.C., et al., A definition of advanced types of atherosclerotic lesions and a histological classification of atherosclerosis a report from the Committee on Vascular Lesions of the Council on Arteriosclerosis, American Heart Association. Circulation, 1995. 92(5): p. 1355-1374.

Stary, H.C., Natural history and histological classification of atherosclerotic lesions: an update. Arteriosder Thromb Vasc Biol, 2000. 20(5): p. 1177-8.

Stefanini, G.G. and S. Windecker, Can coronary computed tomography angiography replace invasive angiography? Coronary computed tomography angiography cannot replace invasive angiography. Circulation, 2015. 131(4): p. 418-25; discussion 426.

Steinvil, A., et al., Impact of Carotid Atherosclerosis on the Risk of Adverse Cardiac Events in Patients With and Without Coronary Disease. Stroke, 2014. 45(8): p. 2311-2317.

Strauss, H.W. and J. Narula, Imaging Vulnerable Plaque: A Medical Necessity or a Scientific Curiosity?. Journal of the American College of Cardiology, 2017. 69(14): p. 1792-1794.

(56) References Cited

OTHER PUBLICATIONS

Sui et al. "Assessment of Wall Shear Stress in the Common Carotid Artery of Healthy Subjects Using 3.0-Tesla Magentic Resonanance." Acta Radiologica. 49.4(2008):442-449.
Symons, R., et al., Coronary CT Angiography: Variability of CT Scanners and Readers in Measurement of Plaque Volume. Radiology, 2016. 281(3): p. 737-748.
Takaya, N., et al., Presence of Intraplaque Hemorrhage Stimulates Progression of Carotid Atherosclerotic Plaques: A High-Resolution Magnetic Resonance Imaging Study. Circulation, 2005. 111(21): p. 2768-2775.
Tartari, S., et al., High-Resolution MRI of Carotid Plaque With a Neurovascular Coil and Contrast-Enhanced MR Angiography: One-Stop Shopping for the Comprehensive Assessment of CArotid Atherosclerosis. American Journal of Roentgenology, 2011. 196(5): p. 1164-1171.
Ten Kate et al. "Noninvasive Imaging of the Vulnerable Atherosclerotic, Plaque." Current Problems Cardiol. 35.11 (2010):556-591.
Tesche, C., et al., Coronary CT angiography-derived fractional flow reserve: machine learning algorithm versus computational fluid dynamics modeling. Radiology, 2018: p. 171291.
Tesche, C., et al., Prognostic implications of coronary CT angiography-derived quantitative markers for the prediction of major adverse cardiac events. J Cardiovasc Comput Tomogr, 2016. 10(6): p. 458-465.
Tonino, P.A., et al., Angiographic versus functional severity of coronary artery stenoses in the FAME study: fractional flow reserve versus angiography in multivessel evaluation. Journal of the American College of Cardiology, 2010. 55(25): p. 2816-2821.
Trelles, M., et al., CTA for Screening of Complicated Atherosclerotic Carotid Plaque—American Heart Association Type VI Lesions as Defined by MRI. American Journal of Neuroradiology, 2013. 34(12): p. 2331-2337.
Tu, S., et al., A novel three-dimensional quantitative coronary angiography system: In-vivo comparison with intravascular ultrasound for assessing arterial segment length. Catheterization and Cardiovascular Interventions, 2010. 76(2): p. 291-298.
Tu, S., et al., In vivo comparison of arterial lumen dimensions assessed by co-registered three-dimensional (3D) quantitative coronary angiography, intravascular ultrasound and optical coherence tomography. Int J Cardiovasc Imaging, 2012. 28(6): p. 1315-1327.
U-King-Im, J.M., et al., Characterization of Carotid Plaque Hemorrhage: A CT Angiography and MR Intraplaque Hemorrhage Study. Stroke, 2010. 41(8): p. 1623-1629.
Underhill, H., et al., Differences in carotid arterial morphology and composition between individuals with and without obstructive coronary artery disease: A cardiovascular magnetic resonance study. Journal of Cardiovascular Magnetic Resonance, 2008. 10(1): p. 31.
Underhill, H.R., et al., A noninvasive imaging approach to assess plaque severity: the carotid atherosclerosis score. AJNR Am J Neuroradiol, 2010. 31(6): p. 1068-75.
Underhill, H.R., et al., Arterial remodeling in [corrected] subclinical carotid artery disease. JACC Cardiovasc Imaging, 2009. 2(12): p. 1381-9.
Underhill, H.R., et al., Automated measurement of mean wall thickness in the common carotid artery by MRI: a comparison to intima-media thickness by B-mode ultrasound. J Magn Reson Imaging, 2006. 24(2): p. 379-87.
Van 't Klooster, R., et al., Automated Versus Manual In Vivo Segmentation of Carotid Plaque MRI. American Journal of Neuroradiology, 2012. 33(8): p. 1621-1627.
Van 't Klooster, R., et al., Visualization of Local Changes in Vessel Wall Morphology and Plaque Progression in Serial Carotid Artery Magnetic Resonance Imaging. Stroke, 2014. 45(8): p. e160-e163.
Achenbach, S., et al., Assessment of coronary remodeling in stenotic and nonstenotic coronary atherosclerotic lesions by multidetector spiral computed tomography. J Am Coll Cardiol, 2004. 43(5): p. 842-847.

Achenbach, S., et al., Detection of Calcified and Noncalcified Coronary Atherosclerotic Plaque by Contrast-Enhanced, Submillimeter Multidetector Spiral Computed Tomography: A Segment-Based Comparison With Intravascular Ultrasound. Circulation, 2004. 109(1): p. 14-17.
Aerts, H.J.W.L., et al., Decoding tumour phenotype by noninvasive imaging using a quantitative radiomics approach. Nat Commun, 2014.
Agner, S., Xu, J, Madabhushi, A Spectral Embedding based Active Contour (SEAC): Applications to DCE MRI, in SPIE Medical Imaging. 2011, SPIE. p. In Press.
Agner, S.C., et al., Textural Kinetics: A Novel Dynamic Contrast-Enhanced (DCE)-MRI Feature for Breast Lesion Classification. Journal of Digital Imaging, 2010.
Ahmadi, A., A. Kini, and J. Narula, Discordance between ischemia and stenosis, or PINSS and NIPSS: are we ready for new vocabulary? 2015, JACC: Cardiovascular Imaging.
Ahmadi, A., el al., Association of Coronary Stenosis and Plaque Morphology With Fractional Flow Reserve and Outcomes. JAMA Cardiol, 2016. 1(3): p. 350-7.
Ahmadi, A., et al., Do plaques rapidly progress prior to myocardial infarction? The interplay between plaque vulnerability and progression. Circulation research, 2015. 117(1): p. 99-104.
Ahmadi, A., et al., Lesion-Specific and Vessel-Related Determinants of Fractional Flow Reserve Beyond Coronary Artery Stenosis. JACC Cardiovasc Imaging, 2018. 11(4): P. 521-530.
Albuquerque, L.C., et al., Intraplaque hemorrhage assessed by high-resolution magnetic resonance imaging and C-reactive protein in carotid atherosclerosis. Journal of Vascular Surgery, 2007.46(6): p. 1130-1137.
Alic, L., W.J. Niessen, and J.F. Veenland, Quantification of heterogeneity as a biomarker in tumor imaging: a systematic review. PloS one, 2014. 9(10): p. e110300.
Alimohammadi, M., et al., Development of a Patient-Specific Multi-Scale Model to Understand Atherosclerosis and Calcification Locations: Comparison with In vivo Data in an Aortic Dissection. Front Physiol, 2016. 7: p. 238.
Altaf, N., et al., Detection of intraplaque hemorrhage by magnetic resonance imaging in symptomatic patients with mild to moderate carotid stenosis predicts recurrent neurological events. Journal of Vascular Surgery, 2008. 47(2): p. 337-342.
Altorki, N., et al., Phase II proof-of-concept study of pazopanib monotherapy in treatment-naive patients with stage I/II resectable non-small-cell lung cancer. J Clin Oncol, 2010. 28(19): p. 3131-7.
Anderson, J.D., et al., Multifactorial Determinants of Functional Capacity in Peripheral Arterial Disease: Uncoupling of Calf Muscle Perfusion and Metabolism. J Am Coll Cardiol, 2009. 54(7): p. 628-635.
Aoki, T., et al., Peripheral Lung Adenocarcinoma: Correlation of Thin-Section CT Findings with Histologic Prognostic Factors and Survival 1. Radiology, 2001. 220(3): p. 803-809.
Ariff et al. "Carotid Artery Hemodynamics: Observing Patient-specific Changes with Amlodipine and Lisinopril by Using MRI Imaging Computation Fluid Dynamics." Radiol. 257.3(2010):662-669.
Astor, B.C., et al., Remodeling of Carotid Arteries Detected with MR Imaging: Atherosclerosis Risk in Communities Carotid MRI Study. Radiology, 2010. 256(3): p. 879-886.
Atkinson, A.J., et al., Biomarkers and surrogate endpoints: Preferred definitions and conceptual framework*. Clinical Pharmacology & Therapeutics, 2001. 69(3): p. 89-95.
Awai, K., et al., Pulmonary Nodules: Estimation of Malignancy at Thin-Section Helical CT—Effect of Computer-aided Diagnosis on Performance of Radiologists 1. Radiology, 2006. 239(1): p. 276-284.
Bar, L., N. Sochen, and N. Kiyati, Semi-blind image restoration via Mumford-Shah regularization IEEE Trans Image Process, 2006. 15(2): p. 483-93.
Barnett, H.J., et al., Benefit of carotid endarterectomy in patients with symptomatic moderate or severe stenosis. North American Symptomatic Carotid Endarterectomy Trial Collaborators. N Engl J Med, 1998. 339(20): p. 1415-25.

(56) References Cited

OTHER PUBLICATIONS

Bartlett, E.S., et al., Quantification of Carotid Stenosis on CT Angiography. American Journal of Neuroradiology, 2006. 27(1): p. 13-19.

Behnke, L., Solis A, Schulman SA, Skoufalos A, A Targeted Approach to Reducing Overutikzation: Use of Percutaneous Coronary Intervention in Stable Coronary Artery Disease. Population Health Management, 2013. 16(3).

Bishop, C. and C.M. Bishop, Neural networks for pattern recognition. 1995: Oxford university press.

Bittencourt, M.S., et al., Prognostic Value of Nonobstructive and Obstructive Coronary Artery Disease Detected by Coronary Computed Tomography Angiography to Identify Cardiovascular Events. Circulation: Cardiovascular Imaging, 2014. 7(2): p. 282-291.

Bluemke, D.A., et al., Noninvasive Coronary Artery Imaging: Magnetic Resonance Angiography and Multidetector Computed Tomography Angiography: A Scientific Statement From the American Heart Association Committee on Cardiovascular Imaging and Intervention of the Council on Cardiovascular Radiology and Intervention, and the Councils on Clinical Cardiology and Cardiovascular Disease in the Young. Circulation, 2008. 118(5): p. 586-606.

Bochem, A.E., et al., ABCA1 mutation carriers with low high-density lipoprotein cholesterol are characterized by a larger atherosclerotic burden. Eur Heart J, 2012.

Boogers, M.J., et al., Automated quantification of coronary plaque with computed tomography: comparison with intravascular ultrasound using a dedicated registration algorithm for fusion-based quantification. Eur Heart J, 2012. 33(8): p. 1007-1016.

Boogers, M.J., et al., Automated Quantification of Stenosis Severity on 64-Slice CT: A Comparison With Quantitative Coronary Angiography. JACC: Cardiovascular Imaging, 2010. 3(7): p. 699-709.

Bourque et al. "Usefulness of Cardiovascular Magnetic Resonance Imaging of the Superficial Femoral Artery for Screening Patients with Diabetes Mellitus for Artherosclerosis." Am. J. Cardiol. 110. 1(2012):50-5.

Bradley, S.M., et al., Normal Coronary Rates for Elective Angiography in the Veterans Affairs Healthcare System: Insights From the VA CART Program (Veterans Affairs Clinical Assessment Reporting and Tracking). J Am Coll Cardiol, 2014. 63(5): p. 417-426.

Brandman, S. and J.P. Ko, Pulmonary nodule detection, characterization, and management with multidetector computed tomography. Journal of Thoracic Imaging, 2011. 26(2): p. 90-105.

Brodoefel, H., et al., Accuracy of dual-source CT in the characterisation of non-calcified plaque: use of a colour-coded analysis compared with virtual histology intravascular ultrasound. The British Journal of Radiology, 2009. 82(982): p. 805-812.

Brodoefel, H., et al., Characterization of coronary atherosclerosis by dual-source computed tomography and HU-based color mapping: a pilot study. European radiology, 2008. 18(11): p. 2466-2474.

Brott, T.G., et al., 2011 ASA/ACCF/AHA/AANN/AANS/ACR/ASNR/CNS/SAIP/SCAI/SIR/SNIS/SVW/SVS Guideline on the Management of Patients With Extracranial Carotid and Vertebral Artery Disease. Circulation, 2011. 124: p. e54-e130.

Brott, T.G., et al., Long-Term Results of Stenting versus Endarterectomy for Carotid-Artery Stenosis. N Engl J Med, 2016. 374(11): p. 1021-31.

Buckler et al. "A Collaborative Enterprise for Multi-Stakeholder Participation in the Advancement of Quantitative Imaging." Radiol. 258.3(2011):906-914.

Buckler et al. "Data Sets for the Qualification of CT as a Quantitative Imaging Biomarker in Lung Cancer." Optics Exp. 18.14 (2010):16.

Buckler et al. "Data Sets for the Qualification of Volumetric CT as a Quantitative Imaging Biomarker in Lung Cancer." Optics Exp. 18.14(2010):15267-15282.

Buckler et al. "Quantitative Imaging Test Approval and Biomarker Qualification: Interrelated but Distinct Activities." Radiol. 259. 3(2011):875-884.

Buckler et al. "Standardization of Quantitative Imaging: The Time is Right and 18F-FDG PET/CT is a Good Place to Start." J. Nuclear Med. 52.2(2011):171-172.

Buckler et al. "The Use of Volumetric CT as an Imaging Biomarker in Lung Cancer." Acadmic Radiol. 17.1 (2010):100-106.

Buckler et al. "Volumetric CT in Lung Cancer. An Example for the Qualification of Imaging as a Biomarker." Academic Radiol. 17.1(2010):107-115.

Buckler, A., et al., A Novel Knowledge Representation Framework for the Statistical Validation of Quantitative Imaging Biomarkers. Journal of Digital Imaging, 2013. 26(4): p. 614-629.

Buckler, A.J., et al., Quantitative imaging biomarker ontology (QIBO) for knowledge representation of biomedical imaging biomarkers. Journal of digital imaging : the official journal of the Society for Computer Applications in Radiology, 2013. 26(4): p. 630-41.

Burzykowski, T., et al., Evaluation of tumor response, disease control, progression-free survival, and time to progression as potential surrogate end points in metastatic breast cancer. J Clin Oncol, 2008. 26(12): p. 1987-92.

Buyse et al. "The Validation of Surrogate Endpoints in Meta-Analysis of Randomized Experiments." Biostat. 1(2000):1-19.

Buyse, M., et al., Statistical validation of surrogate endpoints: problems and proposals. Drug Information Journal, 2000, 34(2): p. 447-454.

Cai, J., et al., In vivo quantitative measurement of intact fibrous cap and lipid-rich necrotic core size in atherosderotic carotid plaque: comparison of high-resolution, contrast-enhanced magnetic resonance imaging and histology. Circulation, 2005. 112(22): p. 3437-44.

Cai, J.M., et al., Classification of human carotid atherosclerotic lesions with in vivo multicontrast magnetic resonance imaging. Circulation, 2002. 106(11): p. 1368-73.

Cappendijk, V.C., et al., Assessment of human atherosclerotic carotid plaque components with multisequence MR Imaging: initial experience. Radiology, 2005. 234(2): p. 487-92.

Carter, H.H., et al., Evidence for Shear Stress-Mediated Dilation of the Internal Carotid Artery in Humans. Hypertension, 2016. 68(5): p. 1217-1224.

Caselles, V., R. Kimmel, and G. Sapiro, Geodesic Active Contours. International Journal on Computer Vision, 1997. 22(1): p. 61-97.

Castellano et al. "Texture analysis of medical images," Clinical Radiology, Dec. 1, 2004 (Dec. 1, 2004) vol. 59.

Chan et al. "Active Contours without Edges." IEEE Trans. Image Process. 10.2(2001):266-277.

Chang HJ, F.Y.L., et al. Coronary Atherosclerotic Precursors of Acute Coronary Syndromes. Journal of the American College of Cardiology (JACC), 2018. 71(22).

Chang, A.M., et al., Actual Financial Comparison of Four Strategies to Evaluate Patients with Potential Acute Coronary Syndromes. Academic Emergency Medicine, 2008. 15(7): p. 649-655.

Chinnaiyan, K.M., et al., Coronary computed tomography angiography after stress testing: results from a multicenter, statewide registry, ACIC (Advanced Cardiovascular Imaging Consortium). Journal of the American College of Cardiology, 2012. 59(7): p. 688-695.

Choi et al. "Multiscale image segmentation using wavelet-domain hidden Markov models" IEEE Trans Image Process, Sep. 1, 2001 (Sep. 1, 2001), vol. 10.

Ciccone, M.M., et al., Cardiovascular risk evaluation and prevalence of silent myocardial ischemia in subjets with asymptomatic carotid artery disease. Vasc Health Risk Manag, 2011. 7: p. 129-34.

Coenen, A., et al., Diagnostic accuracy of a machine-learning approach to coronary computed tomographic angiography-based fractional flow reserve: result from the MACHINE consortium. Circulation: Cardiovascular Imaging, 2018. 11(6): p. e007217.

Collobert, R., et al., Natural language processing (almost) from scratch. Journal of Machine Learning Research, 2011. 12(Aug): p. 2493-2537.

Davies, J.R., et al., Radionuclide Imaging for the Detection of Inflammation in Vulnerable Plaques. J Am Coll Cardiol, 2006. 47(8, Supplement): p. C57-C68.

De Bono, B., et al., The Open Physiology workflow: modeling processes over physiology circuitboards of interoperable tissue units. Front Physiol, 2015. 6: p. 24.

(56) References Cited

OTHER PUBLICATIONS

De Bruyne, B., et al., Fractional flow reserve-guided PCI for stable coronary artery disease. New England Journal of Medicine, 2014. 371(13): p. 1208-1217.
De Graaf, M., et al., Automatic quantification and characterization of coronary atherosclerosis with computed tomography coronary angiography: cross-correlation with intravascular ultrasound virtual histology. Int J Cardiovasc imaging, 2013. 29(5): p. 1177-1190.
De Weert et al. "In Vivo Characterization and Quantification of Atherosclerotic Carotid Plaque Components with Multidetector Computed Tomography and Histopathological Correlation." Arterioscler. Thromb. Vasc. Biol. 26.10 (2006):2366-2372.
DeMarco, J.K. and J. Huston, Imaging of high-risk carotid artery plaques: current status and future directions. Neurosurgical Focus, 2014. 36(1): p. E1.
Depairon, M., Cardiovascular risk prediction with ultrasound. Cardiovascular Medicine, 2010. 13(9): p. 255-264.
Dey, D. and F. Commandeur, Radiomics to Identify High-Risk Atherosclerotic Plaque From Computed Tomography: The Power of Quantification. Circ Cardiovasc Imaging, 2017. 10(12).
Dey, D., et al., Automated 3-dimensional quantification of noncalcified and calcified coronary plaque from coronary CT angiography. Journal of Cardiovascular Computed Tomography, 2010. 3(6): p. 372-382.
Diaz-Zamudio, M., et al., Automated Quantitative Plaque Burden from Coronary CT Angiography Noninvasively Predicts Hemodynamic Significance by using Fractional Flow Reserve in Intermediate Coronary Lesions. Radiology, 2015. 276(2): p. 408-15.
Dodd, J.D., et al., Quantification of Nonculprit Coronary Lesions: Comparison of Cardiac 64-MDCT and Invasive coronary Angiography. American Journal of Roentgenology, 2008. 191(2): p. 432-438.
Dong, L., et al., Carotid Artery Atherosclerosis: Effect of Intensive Lipid Therapy on the Vasa Vasonim—Evaluation by Using Dynamic Contrast-enhanced MR Imaging. Radiology, 2011. 260(1): p. 224-231.
Du, R., et al., Early decrease in carotid plaque lipid content as assessed by magnetic resonance imaging during treatment of rosuvastatin. BMC Cardiovascular Disorders, 2014. 14(1): p. 83.
Duivenvoorden, R., et al., In Vivo Quantification of Carotid Artery Wall Dimensions: 3.0-Tesla MRI Versus B-Mode Ultrasound Imaging. Circulation: Cardiovascular Imaging, 2009. 2(3): p. 235-242.
Ederle, J., et al., Carotid artery stenting compared with endarterectomy in patients with symptomatic carotid stenosis (International Carotid Stenting Study): an interim analysis of a randomised controlled trial. Lancet, 2010. 375(9719): p. 985-97.
Ernst, C.B., HeartFlow Announces Positive Medical Coverage Decisions on Non-Invasive HeartFlow® FFRct Analysis from Anthem Blue Cross Blue Shield, Blue Shield of California and Blue Cross and Blue Shield of Alabama. 2017, Heartflow Inc.: Redwood City, Calif.
Esposito, L., et al., MRI plaque imaging reveals high-risk carotid plaques especially in diabetic patients irrespective of the degree of stenosis. BMC Medical Imaging, 2010. 10(1): p. 27.
Esposito-Bauer, L., et al., MRI Plaque Imaging Detects Carotid Plaques with a High Risk for Future Cerebrovascular Events in Asymptomatic Patients. PLoS One, 2013. 8(7): p. e67927.
F D Kolodgie, R.V., A P Burke, A Farb, D K Weber, R Kutys, A V Finn, H K Gold, Pathologic assessment of the vulnerable human coronary plaque. Heart, 2004. 90.
Fayad, Z.A., et al., Magnetic Resonance Imaging of Atherosclerotic Plaque, I.P. WO/2005/079274, Editor, May 9, 2005.
Ferencik, M., et al., Use of High-Risk Coronary Atherosclerotic Plaque Detection for Risk Stratification of Patients With Stable Chest Pain: A Secondary Analysis of the PROMISE Randomized Clinical Trial. JAMA Cardiol, 2018. 3(2): p. 144-152.
Filardi, V., Carotid artery stenosis near a bifurcation investigated by fluid dynamic analyses. The neuroradiology Journal, 2013. 26(4): p. 439-453.
Fleming, T.R. and D.L. DeMets, Surrogate end points in clinical trials: are we being misled? Ann Intern Med, 1996. 125(7): p. 605-13.
Fleming. "Surrogate Endpoints and FDA's Accelerated Approval Process." Health Affairs. 24.1(2005):67-78.
Freedman et al. "Statistical Validation of Intermediate Endpoints for Chronic Diseases." Stat. Med. 11(1992):167-178.
Freimuth, R.R., et al., Life sciences domain analysis model. J Am Med Inform Assoc, 2012. 19(6): p. 1095-102.
Fuchs, T., et al., Coronary artery calcium quantification from contrast enhanced CT using gemstone spectral imaging and material decomposition. Int J Cardiovasc Imaging, 2014. 30(7): p. 1399-1405.
Fujimoto, S., et al., A novel method for non-invasive plaque morphology analysis by coronary computed tomography angiography. Int J Cardiovasc Imaging, 2014. 30(7): p. 1373-1382.
Fuleihan et al. "Reproducibility of DXA Absorptiometry: A Model for , , Bone Loss Estimates." J. Bone Miner. Res. 10.74(1995):1004-1014.
Fuster, V. and P.R. Moreno, Atherothrombosis as a systemic, often silent, disease. Nat Clin Pract Cardiovasc Med, 2005. 2(9): p. 431.
Gao, T., Z. Zhang, and W. Yu, Atherosclerotic Carotid Vulnerable Plaque and Subsequent Stroke: A High-Resolution MRI Study. Atherosclerotic Carotid Vulnerable Plaque and Subsequent Stroke: A High-Resolution MRI Study, 2009. 27: p. 345-352.
Garcia-Garcia, H.M., M.A. Costa, and P.W. Serruys, Imaging of coronary atherosclerosis: intravascular ultrasound. Eur Heart J, 2010. 31(20): p. 2456-69.
Gaston A. Rodriguez-Granillo1, Patricia Carrascosa1, Nico Bruining3, and a.H.M.G.-G. RonWaksman4, Defining the non-vulnerable and vulnerable patients with computed tomography coronary angiography: evaluation of atherosclerotic plaque burden and composition. European Heart Journal—Cardiovascular Imaging, 2016. 2016(17): p. 481-491.
Gerretsen, S., et al., Detection of coronary plaques using MR coronary vessel wall imaging: validation of findings with intravascular ultrasound. European radiology, 2013. 23(1): p. 115-124.
Gerretsen, S.C., et al., Visualization of Coronary Wall Atherosclerosis in Asymptomatic Subjects and Patients with Coronary Artery Disease Using Magnetic Resonance Imaging. PLoS One, 2010. 5(9): p. e12998.
Gevaert, O., et al., Non-small cell lung cancer: identifying prognostic imaging biomarkers by leveraging public gene expression microarray data—methods and preliminary results. Radiology, 2012. 264(2): p. 387-396.
Ghazalpour, A., et al., Thematic review series: The pathogenesis of atherosclerosis. Toward a biological network for atherosclerosis. J Lipid Res, 2004. 45(10): p. 1793-805.
Juan, S., Stents overused to treat heart patients, in China Daily. 2012: Online, English Edition.
Karlof, E., Correlation of Computed Tomography with Carotid Plaque Transcriptomes Associates Calcification to Lesion-Stabilization (Abstract). 2018, Karolinska Institutet.
Katz, "Biomarkers and Surrogate Markers: An FDA Perspective." NeuroRx. 1.2(2004):189-195.
Kaul, S. and J. Narula, In search of the vulnerable plaque: is there any light at the end of the catheter? 2014, Journal of the American College of Cardiology.
Kawahara, I., et al., The detection of carotid plaque rupture caused by intraplaque hemorrhage by serial high-resolution magnetic resonance imaging: a case report. Surg Neurol, 2008. 70(6): p. 634-9; discussion 639.
Kawasaki, M., et al., Volumetric Quantitative Analysis of Tissue Characteristics of Coronary Plaques After Statin Therapy Using Three-Dimensional Integrated Backscatter Intravascular Ultrasound. J Am Coll Cardiol, 2005. 45(12): p. 1946-1953.
Kerwin et al. "MRI of Carotid Artheroesclerosis." Am. J. Roentgenol. 200.(2013):W304-W313.
Kerwin, W., et al., Magnetic resonance imaging of carotid atherosclerosis: plaque analysis. Top Magn Reson Imaging, 2007. 18(5): p. 371-8.

(56) References Cited

OTHER PUBLICATIONS

Kerwin, W., et al., Quantitative Magnetic Resonance Imaging Analysis of Neovasculature Volume in Carotid Atherosclerotic Plaque. Circulation, 2003. 107(6): p. 851-856.

Kerwin, W.S., et al., Inflammation in carotid atherosclerotic plaque: a dynamic contrast-enhanced MR imaging study. Radiology, 2006. 241(2): p. 459-68.

Kerwin, W.S., et al., MR imaging of adventitial vasa vasorum in carotid atherosclerosis. Magnetic Resonance in Medicine, 2008. 59(3): p. 507-514.

Kerwin, W.S., et al., Signal features of the atherosclerotic plaque at 3.0 Tesla versus 1.5 Tesla: impact on automatic classification. J Magn Reson Imaging, 2008. 28(4): p. 987-95.

Khan et al., "Robust atlas-based brain segmentation using multi-structure confidence-weighted registration" Proceedings of the 12th International Conference on Medical Imaging Computing, Sep. 20, 2009.

Kholodenko, B.N., Cell-signalling dynamics in time and space. Nat Rev Mol Cell Biol, 2006. 7(3): p. 165-76.

Kim et al. "A Curve Evolution-based variational approach to Simultaneous Image Restoration and Segmentation." IEEE Int. Conf. Image Proc. (2002) 1-109.

Kini, A.S., et al., Changes in Plaque Lipid Content After Short-Term Intensive Versus Standard Stalin Therapy. Journal of the American College of Cardiology, 2013. 62(1): p. 21-9.

Kishi, S., et al., Fractional Flow Reserve Estimated at Coronary CT Angiography in Intermediate Lesions: Comparison of Diagnostic Accuracy of Different Methods to Determine Coronary Flow Distribution. Radiology, 2018. 287(1): p. 76-84.

Kitagawa, T., et al., Characterization of Noncalcified Coronary Plaques and Identification of Culprit Lesions in Patients With Acute Coronary Syndrome by 64-Slice Computed Tomography. JACC: Cardiovascular Imaging, 2009. 2(2): p. 153-160.

Kohsaka, S. and A.N. Makaryus, Coronary angiography using noninvasive imaging techniques of cardiac CT and MRI. Current cardiology reviews, 2008. 4(4): p. 323.

Kolata, G., 'Unbelievable': Heart Stents Fail to Ease Chest Pain, in New York Times. 2017.

Kolossváry, M., et al., Radiomic Features Are Superior to Conventional Quantitative Computed Tomographic Metrics to identify Coronary Plaques With Napkin-Ring Sign. Circ Cardiovasc Imaging, 2017. 10(12).

Koo, B.K., et al., Diagnosis of ischemia-causing coronary stenoses by noninvasive fractional flow reserve computed from coronary computed tomographic angiograms. Results from the prospective multicenter Discover-Flow (Diagnosis of Ischemia-Causing Stenoses Obtained Via Noninvasive Fractional Flow Reserve) study. J Am Coll Cardiol, 2011. 58(19): p. 1989-97.

Korn, E.L., P.S. Albert, and L.M. McShane, Assessing surrogates as trial endpoints using mixed models. Statistics in medicine, 2005. 24(2): p. 163-182.

Krizhevsky, A., I. Sutskever, and G.E. Hinton. Imagenet classification with deep convolutional neural networks. in Advances in neural information processing systems. 2012.

Langlotz, C.P., Enhancing the Expressiveness of Structured Reporting Systems. J. Digit. Imaging, 2000. 13: p. 49-53.

Larose, E., et al., Characterization of Human Atherosclerotic Plaques by Intravascular Magnetic Resonance Imaging. Circulation, 2005. 112(15): p. 2324-2331.

Lathia et al. "The Value, Qualification, and Regulatory Use of Surrogate End Points in Drug Development." Clin. Pharmacol. Therapeutics. 86.1(2009):32-43.

Lavi, S., et al., Segmental coronary endothelial dysfunction in patients with minimal atherosclerosis is associated with necrotic core plaques. Heart, 2009. 95(18): p. 1525-1530.

Lavi, S., et al., The interaction between coronary endothelial dysfunction, local oxidative stress, and endogenous nitric oxide in humans. Hypertension, 2008. 51(1): p. 127-133.

Leber, A.W., et al., Quantification of Obstructive and Nonobstructive Coronary Lesions by 64-Slice Computed Tomography: A Comparative Study With Quantitative Coronary Angiography and Intravascular Ultrasound. J Am Coll Cardiol, 2005. 46(1): p. 147-154.

Levin DC, P.L., Halpern EJ, Rao VM, Coronary CT Angiography: Use in Patients With Chest Pain Presenting to Emergency Departments. American Journal of Roentgenology, 2018. 210(4): p. 4.

Li, D., Z.A. Fayad, and D.A. Bluemke, Can Contrast-Enhanced Cardiac Magnetic Resonance Assess Inflammation of the Coronary Wall? JACC: Cardiovascular Imaging, 2009. 2(5): p. 589-591.

Li, F., et al., Scan-rescan reproducibility of carotid atherosclerotic plaque morphology and tissue composition measurements using multicontrast MRI at 3T. J Magn Reson Imaging, 2010. 31(1): p. 168-76.

Li, T., et al., Classification of Human Coronary Atherosclerotic Plaques Using Ex Vivo High-Resolution Multicontrast-Weighted MRI Compared With Histopathology. American Journal of Roentgenology, 2012. 198(5): p. 1069-1075.

Lindsay, A.C., et al., Plaque Features Associated With Increased Cerebral Infarction After Minor Stroke and TIA: A Prospective, Case-Control, 3-T Carotid Artery MR Imaging Study. JACC: Cardiovascular Imaging, 2012. 5(4): p. 388-396.

Litt, H.I., et al., CT Angiography for Safe Discharge of Patients with Possible Acute Coronary Syndromes. N Engl J Med, 2012. 366(15): p. 1393-403.

Liu, F., et al., Assessment of therapy responses and prediction of survival in malignant pleural mesothelioma through computer-aided volumetric measurement on computed tomography scans. J Thorac Oncol, 2010. 5(6): p. 879-84.

Liu, F., et al., Automated in vivo segmentation of carotid plaque MRI with Morphology-Enhanced probability maps. Magn Reson Med, 2006. 55(3): p. 659-68.

Liu, R., et al., Noninvasive numerical simulation of coronary fractional flow reserve based on lattice Boltzmann method. Sheng wu yi xue gong cheng xue za zhi= Journal of biomedical engineering= Shengwu yixue gongchengxue zazhi, 2018.35(3): p. 384-389.

Lobatto, M.E., et al., Multimodal Clinical Imaging to Longitudinally Assess a Nanomedical Anti-Inflammatory Treatment in Experimental Atherosclerosis. Molecular Pharmaceutics, 2010. 7(6): p. 2020-2029.

Ma, X., et al., Volumes Learned: It Takes More Than Size to "Size Up" Pulmonary Lesions. Acad Radiol, 2016. 23(9): p. 1190-8.

Mackey, R.H., L. Venkitachalam, and K. Sutton-Tyrrell, Calcifications, arterial stiffness and atherosclerosis. Adv Cardiol, 2007. 44: p. 234-44.

Magge, R., et al., Clinical Risk Factors and CT Imaging Features of Carotid Atherosclerotic Plaques as Predictors of New Incident Carotid Ischemic Stroke: A Retrospective Cohort Study. American Journal of Neuroradiology, 2013. 34(2): p. 402-409.

Maier, D., et al., Knowledge management for systems biology a general and visually driven framework applied to translational medicine. BMC Syst Biol, 2011. 5: p. 38.

Maintz, D., et al., Selective coronary artery plaque visualization and differentiation by contrast-enhanced inversion repared MRI. Eur Heart J, 2006. 27(14): p. 1732-6.

Maitland, M.L., Volums to learn: advancing therapeutics with innovative computed tomography image data analysis. Clin Cancer Res, 2010. 16(18): p. 4493-5.

Makowski, M.R. and R.M. Botnar, MR Imaging of the Arterial Vessel Wall: Molecular Imaging from Bench to Bedside. Radiology, 2013.269(1): p. 34-51.

Makowski, M.R., et al., Characterization of coronary atherosclerosis by magnetic resonance imaging. Circulation, 2013. 128(11): p. 1244-55.

Maldonado, F., et al, Non-invasive Characterization of Histopathologic Features of Pulmonary Nodules of the Lung Adenocarcinoma Spectrum using Computer Aided Nodule Assessment and Risk Yield (CANARY)—a Pilot Study. Journal of thoracic oncology: official publication of the International Association for the Study of Lung Cancer, 2013. 8(4): p. 452.

Mani, V., et al., Predictors of change in carotid atherosclerotic plaque inflammation and burden as measured by 18-FDG-PET and MRI, respectively, in the dal-PLAQUE study. Int J Cardiovasc Imaging, 2014. 30(3): p. 571-582.

(56) References Cited

OTHER PUBLICATIONS

Gibbons, R.J., High-Risk Coronary Atherosclerotic Plaque Assessment by Coronary Computed Tomography Angiography—Should We Use It? JAMA Cardiol, 2018. 3(2): p. 153-154.
Glagov, S., et al., Compensatory enlargement of human atherosclerotic coronary arteries. N Engl J Med, 1987. 316(22): p. 1371-5.
Gnasso, A., et al., In vivo association between low wall shear stress and plaque in subjects with asymmetrical carotid atherosclerosis. Stroke, 1997. 28(5): p. 993-8.
Goldstein, J.A., et al., The CT-STAT (Coronary Computed Tomographic Angiography for Systematic Triage of Acute Chest Pain Patients to Treatment) Trial. J Am Coll Cardiol, 2011. 58(14): p. 1414-1422.
Gonzalo, N., et al., Morphometric Assessment of Coronary Stenosis Relevance With Optical Coherence Tomography: A Comparison With Fractional Flow Reserve and Intravascular Ultrasound. J Am Coll Cardiol, 2012. 59(12): p. 1080-1089.
Gouya, H., et al., Coronary Artery Stenosis in High-risk Patients: 64-Section CT and Coronary Angiography—Prospective Study and Analysis of Discordance. Radiology, 2009. 252(2): p. 377-385.
Grimm, J., et al., Comparison of symptomatic and asymptomatic atherosclerotic carotid plaques using parallel imaging and 3T black-blood in vivo CMR. Journal of Cardiovascular Magnetic Resonance, 2013. 15(1): p. 44.
Gupta, A., et al., Carotid Plaque MRI and Stroke Risk a Systematic Review and Meta-analysis. Stroke, 2013. 44(11): p. 3071-3077.
Gupta, A., et al., Cost-Effectiveness of Carotid Plaque MR Imaging as a Stroke Risk Stratification Tool in Asymptomatic Carotid Artery Stenosis. Radiology, 2015: p. 142843.
Gupta, A., et al., CT angiographic features of symptom-producing plaque in moderate-grade carotid artery stenosis. AJNR Am J Neuroradiol, 2015. 36(2): p. 349-54.
Gupta, A., et al., Detection of Symptomatic Carotid Plaque Using Source Data from MR and CT Angiography: A Correlative Study. Cerebrovasc Dis, 2015. 39(3-4): p. 151-61.
Gupta, A., et al., Evaluation of computed tomography angiography plaque thickness measurements in high-grade carotid artery stenosis. Stroke, 2014. 45(3): p. 740-5.
Gupta, A., et al., Intraplaque high-intensity signal on 3D time-of-flight MR angiography is strongly associated with symptomatic carotid artery stenosis. American Journal of Neuroradiology, 2014. 35(3): p. 557-561.
Gupta, A., et al., Magnetic resonance angiography detection of abnormal carotid artery plaque in patients with cryptogenic stroke. Journal of the American Heart Association, 2015. 4(6): p. e002012.
Gupta, A., et al., Semi-Automated Detection of High-Risk Atherosclerotic Carotid Artery Plaque Features from Computed Tomography Angiography, in European Stroke Conference. 2017: Berlin.
Hamdan, A., et al., A Prospective Study for Comparison of MR and CT Imaging for Detection of Coronary Artery Stenosis. JACC: Cardiovascular Imaging, 2011. 4(1): p. 50-61.
Harder, D.R., et al., Functional hyperemia in the brain: hypothesis for astrocyte-derived vasodilator metabolites. Stroke, 1998. 29(1): p. 229-234.
Hardie, A.D., et al., The impact of expansive arterial remodeling on clinical presentation in carotid artery disease: a multidetector CT angiography study. AJNR Am J Neuroradiol, 2007.28(6): p. 1067-70.
Hassani-Pak, K. and C. Rawlings, Knowledge Discovery in Biological Databases for Revealing Candidate Genes Linked to Complex Phenotypes. J Integr Bioinform, 2017. 14(1).
Hatsukami, T.S. and C. Yuan, MRI in the early identification and classification of high-risk atherosclerotic carotid plaques. Imaging in Medicine, 2010. 2(1): p. 63-75.
Hatsukami, T.S., et al., Visualization of Fibrous Cap Thickness and Rupture in Human Atherosclerotic Carotid Plaque In Vivo With High-Resolution Magnetic Resonance Imaging. Circulation, 2000. 102(9): p. 959-964.
Haug, P.J., et al., A natural language parsing system for encoding admitting diagnoses. Proc AMIA Annu Fall Symp, 1997: p. 814-8.
Haug, P.J., et al., A natural language understanding system combining syntactic and semantic techniques. Proc Annu Symp Comput Appl Med Care, 1994: p. 247-51.
Hecht, H.S., Coronary artery calcium scanning: past, present, and future. JACC Cardiovasc Imaging, 2015. 8: p. 579-596.
Hecht, H.S., J. Narula, and W.F. Fearon, Fractional Flow Reserve and Coronary Computed Tomographic Angiography: A Review and Critical Analysis. Circ Res, 2016. 119(2): p. 300-16.
Helft, G., et al., Progression and regression of atherosclerotic lesions: monitoring with serial noninvasive magnetic resonance imaging. Circulation, 2002. 105(8): p. 993-8.
Hermann, D.M., et al., Coronary Artery Calcification Is an Independent Stroke Predictor in the General Population. Stroke, 2013.
Hideya Yamamoto, Y.K., Toshiro Kftagawa, Norihiko Ohashi, Eiji Kunita, Yoshitaka Iwanaga, Kazuhiro Kobuke, Shunichi Miyazaki, Tomohiro Kawasaki, Shinichiro Fujimoto, Hiroyuki Daida, Takashi Fujii, Aki Sato, Tomokazu Okimoto, Sachio Kuribayashi, Coronary plaque characteristics in computed tomography and 2-year outcomes: The PREDICT study. Journal of Cardiovascular Computed Tomography, 2018. Article in Press.
Hlatky, M.A., et al., Projected Costs and Consequences of Computed Tomography-Determined Fractional Flow Reserve. Clinical cardiology, 2013. 36(12): p. 743-748.
Hoffmann, U., et al., Coronary Computed Tomography Angiography for Early Triage of Patients With Acute Chest Pain: The ROMICAT (Rule Out Myocardial Infarction using Computer Assisted Tomography) Trial. J Am Coll Cardiol, 2009. 53(18): p. 1642-1650.
Hoffmann, U., et al., Coronary CT Angiography versus Standard Evaluation in Acute Chest Pain. N Engl J Med, 2012. 367(4).
Hoffmann, U., et al., Prognostic Value of Noninvasive Cardiovascular Testing in Patients With Stable Chest Pain: Insights From the PROMISE Trial (Prospective Multicenter Imaging Study for Evaluation of Chest Pain). Circulation, 2017. 135(24): p. 2320-2332.
Hofman, J.M.A., et al., Quantification of atherosclerotic plaque components using in vivo MRI and supervised classifiers. Magnetic Resonance in Medicine, 2006. 55(4): p. 790-799.
Horie et al. "Assessment of Carotid Plaque Stability Based on Dynamic Enhancement Pattern in Plaque Components with Multidetector CT Angiography." Stroke. 43.2(2012):393-398.
Hulten, E., et al., Coronary Artery Disease Detected by Coronary Computed Tomographic Angiography Is Associated With Intensification of Preventive Medical Therapy and Lower Low-Density Lipoprotein Cholesterol. Circulation: Cardiovascular Imaging, 2014. 7(4): p. 629-638.
Ibrahimi, P., et al., Coronary and carotid atherosclerosis: How useful is the imaging? Atherosclerosis, 2013. 231(2): p. 323-333.
Inoue, K., et al., Serial Coronary CT Angiography—Verified Changes in Plaque Characteristics as an End Point Evaluation of Effect of Statin Intervention. JACC: Cardiovascular Imaging, 2010. 3(7): p. 691-698.
Insull, W., The pathology of atherosclerosis: plaque development and plaque responses to medical treatment. Am J Med, 2009. 122(1 Suppl): p. S3-S14.
International Search & Written Opinion in co-pending International patent application No. PCT/US2018/046483, dated Feb. 5, 2019.
International Search & Written Opinion in co-pending International patent application No. PCT/US2016/065132, dated Mar. 17, 2017.
Irace et al. "Human Common Carotid Wall Shear Stress as a Function of Age and Gender. A 12-year Follow-up Study." AGE. 34.6(2012):1553-1562.
Isbell, D.C., et al., Reproducibility and reliability of atherosclerotic plaque volume measurements in peripheral arterial disease with cardiovascular magnetic resonance. Journal of Cardiovascular Magnetic Resonance, 2007. 9(1): p. 71-76.
Itu, L., et al., A machine-learning approach for computation of fractional flow reserve from coronary computed tomography. Journal of Applied Physiology, 2016. 121(1): p. 42-52.
Jaffe, "Measures of Response: RECIST, WHO, and New Alternatives." J. Clin. Oncol. 24.20(2006):3245-3251.
JCGM, J., Evaluation of measurement data—Guide to the expression of uncertainty in measurement. Int. Organ. Stand. Geneva ISBN, 2008. 50: p. 134.

(56) References Cited

OTHER PUBLICATIONS

Johnson, A.J., et al., Cohort Study of Structured Reporting Compared with Conventional Dictation. Radiology, 2009. 253(1): p. 74-80.
Johnson, N.P., R.L. Kirkeeide, and K.L. Gould, Is discordance of coronary flow reserve and fractional flow reserve due to methodology or clinically relevant coronary pathophysiology? JACC: Cardiovascular Imaging, 2012. 5(2): p. 193-202.
Joseph A. Ladapo, K.S.G., Pamela S. Douglas, Projected Morbidity and Mortality from Missed Diagnoses of Coronary Artery Disease in the United States. Int J Cardiol, 2015. Sep. 15, 2015: p. 250-252.
Joshi, A.A., et al., GlycA Is a Novel Biomarker of Inflammation and Subclinical Cardiovascular Disease in Psoriasis. Circ Res, 2016. 119(11): p. 1242-1253.
Joshi, F.R., et al., Non-invasive imaging of atherosclerosis. European Heart Journal—Cardiovascular Imaging, 2012. 13(3): p. 205-218.
Aerts, H.J.W.L., et al., Decoding tumour phenotype by noninvasive imaging using a quantitative radiomics approach. Nat Commun, 2014. 5.
Ahmadi, A., et al., Association of Coronary Stenosis and Plaque Morphology With Fractional Flow Reserve and Outcomes. JAMA Cardiol, 2016. 1(3): p. 350-7.
Albuquerque, L.C., et al., Intraplaque hemorrhage assessed by high-resolution magnetic resonance imaging and C-reactive protein in carotid atherosclerosis. Journal of Vascular Surgery. 46(6): p. 1130-1137.
Buckler, A.J., et al., Quantitative imaging test approval and biomarker qualification: interrelated but distinct activities. Radiology, 2011. 259(3): p. 875-84.
Buyse, M., et al., The validation of surrogate endpoints in meta-analyses of randomized experiments. Biostatistics, 2000. 1(1): p. 49-67.
Cai, J., et al., In vivo quantitative measurement of intact fibrous cap and lipid-rich necrotic core size in atherosclerotic carotid plaque: comparison of high-resolution, contrast-enhanced magnetic resonance imaging and histology. Circulation, 2005. 112(22): p. 3437-44.
Chan, T.F. and L.A. Vese, Active contours without edges. IEEE Trans Image Process, 2001. 10(2): p. 266-77.
De Weert, T.T., et al., In Vivo Characterization and Quantification of Atherosclerotic Carotid Plaque Components With Multidetector Computed Tomography and Histopathological Correlation. Arterioscler Thromb Vasc Biol, 2006. 26(10): p. 2366-2372.
Dong, L., et al., Carotid Artery Atherosclerosis: Effect of Intensive Lipid Therapy on the Vasa Vasorum—Evaluation by Using Dynamic Contrast-enhanced MR Imaging. Radiology, 2011. 260(1): p. 224-231.
Gupta, A., el al., Carotid Plaque MRI and Stroke Risk a Systematic Review and Meta-analysis. Stroke, 2013. 44(11): p. 3071-3077.
International Search Report & Written Opinion in co-pending international patent application No. PCT/US16/67463 dated Mar. 10, 2017 (10 pages).
International Search Report & Written Opinion in co-pending international patent application No. PCT/US2016/065132 dated Mar. 17, 2017.
Khan et al. "Robust atlas-based brain segmentation using multi-structure confidence-weighted registration" Proceedings of the 12th International Conference on Medical Image Computing, Sep. 20, 2009.
Lobatto, M.E., et al., Multimodal Clinical Imaging to Longitudinally Assess a Nanomedical Anti-Inflammatory Treatment in Experimental Atherosclerosis. Molecular Pharmaceutics, 2010. 7(6): p. 2020-2029.
Prentice, R.L., Surrogate endpoints in clinical trials: definition and operational criteria. Statistics in medicine, 1989. 8(4): p. 431-440.
Bourque et al. "Usefulness of Cardiovascular Magnetic Resonance Imaging of the Superficial Femoral Artery for Screening Patients with Diabetes Mellitus for Artherosclerosis." Am. J. Cardiol. 110.1(2012):50-56.

Kerwin et al. "MRI of Carotid Artherosclerosis." Am. J. Roentgenol. 200.3(2013):W304-W313.
Van Klavern et al. "Management of Lung Nodules Detected by Volume CT Scanning." New Engl. J. Med. 361(2009):23.
Varma et al. "Coronary Vessel Wall Constrast Enhancement Imaging as a Potential Direct Marker of Coronary Involvement: Integration of Findings from CAD and SLE Patients." JACC Cardiovasc. Imaging. 7.8(2014):762-770.
Wintermark et al. "Carotid Plaque CT Imaging in Stroke and Non-Stroke Patients." Ann. Neurol. 64.2(2008):149-157.
Wintermark et al. "High-Resolution CT Imaging of Carotid Artery Atherosclerotic Plaques." Am. J. Neuroradiol. 29.5(2008):875-882.
Wong et al. "Imaging in Drug Discovery, Precinical, and Early Clinical Development." J. Nuclear Med. 49.6(2008):26N-28N.
Woodcock et al. "The FDA Critical Path Initiative and its Influence on New Drug Development." Annu. Rev. Med. 59(2008):1-12.
Zhao et al. "Evaluating Variability in Tumor Measurements from Same-Day Repeat CT Scans of Patients with Non-Small Cell Lung Cancer." Radiol. 252.1(2009):263-272.
Sargent, D., et al., Validation of novel imaging methodologies for use as cancer clinical trial end-points. European Journal of Cancer, 2009. 45(2): p. 290-299.
Virmani, R., et al., Pathology of the Vulnerable Plaque. JACC, 2006. 47(8): p. C13-8.
Voros, S., et al., Coronary Atherosclerosis Imaging by Coronary CT Angiography. JACC Cardiovasc Imaging, 2011. 4(5): p. 537-48.
William B. Kerr et al. "A Methodology and Metric for Quantitative Analysis and Parameter Optimization of Unsupervised, Multi-Region Image Segmentation", Proceeding of the 8th IASTED International Conference on Signal and Image Processing, Aug. 14, 2006, pp. 243-248.
Zavodni, A.E.H., et al., Carotid Artery Plaque Morphology and Composition in Relation to Incident Cardiovascular Events: The Multi-Ethnic Study of Atherosclerosis (MESA). Radiology, 2014. 271(2): p. 381-389.
Van den Bouwhuijsen, Q.J.A., et al., Determinants of magnetic resonance imaging detected carotid plaque components: the Rotterdam Study. Eur Heart J, 2012. 33(2): p. 221-229.
Van't Klooster, R., et al., Automatic lumen and outer wall segmentation of the carotid artery using deformable three-dimensional models in MR angiography and vessel wall images. Journal of Magnetic Resonance Imaging, 2012. 35(1): p. 156-165.
Vegsundvåg, J., et al., Coronary Flow Velocity Reserve in the Three Main Coronary Arteries Assessed with Transthoracic Doppler: A Comparative Study with Quantitative Coronary Angiography. Journal of the American Society of Echocardiography, 2011. 24(7): p. 758-767.
Virmani, R., et al., Lessons from sudden coronary death: a comprehensive morphological classification scheme for atherosclerotic lesions. Arterioscler Thromb Vasc Biol, 2000. 20(5): p. 1262-75.
Vliegenthart, R., et al., Dual-Energy CT of the Heart. American Journal of Roentgenology, 2012. 199(5_supplement): p. S54-S63.
Von Birgelen, C., et al., Relation Between Progression and Regression of Atherosclerotic Left Main Coronary Artery Disease and Serum Cholesterol Levels as Assessed With Serial Long-Term (=12 Months) Follow-Up Intravascular Ultrasound. Circulation, 2003. 108(22): p. 2757-2762.
Voros, S., et al., Prospective Validation of Standardized, 3-Dimensional, Quantitative Coronary Computed Tomographic Plaque Measurements Using Radiofrequency Backscatter Intravascular Ultrasound as Reference Standard in Intermediate Coronary Arterial Lesions: Results From the ATLANTA I Study. JACC: Cardiovascular Interventions, 2011. 4(2): p. 198-208.
Vukadinovic, D., Automated Quantification of Atherosclerosis in CTA of Carotid Arteries. 2012: Erasmus University Rotterdam.
Wagenknecht, L., et al., Correlates of Carotid Plaque Presence and Composition as Measured by MRI: The Atherosclerosis Risk in Communities Study. Circulation: Cardiovascular Imaging, 2009. 2(4): p. 314-322.
Walker, L.J., et al., Computed tomography angiography for the evaluation of carotid atherosclerotic plaque correlation with histopathology of endarterectomy specimens. Stroke, 2002. 33(4): p. 977-981.

(56) References Cited

OTHER PUBLICATIONS

Wan, T., et al., Spatio-temporal texture (SpTeT) for distinguishing vulnerable from stable atherosclerotic plaque on dynamic contrast enhancement (DCE) MRI in a rabbit model. Medical Physics, 2014 (Apr. 2014).
Wasserman, B.A., et al., Carotid artery atherosclerosis: in vivo morphologic characterization with gadolinium-enhanced double-oblique MR imaging initial results. Radiology, 2002. 223(2): p. 566-73.
Wasserman, B.A., et al., MRI measurements of carotid plaque in the atherosclerosis risk in communities (ARIC) study: Methods, reliability and descriptive statistics. Journal of Magnetic Resonance Imaging, 2010. 31(2): p. 406-415.
Wasserman, B.A., et al., Risk Factor Associations With the Presence of a Lipid Core in Carotid Plaque of Asymptomatic Individuals Using High-Resolution MRI: The Multi-Ethnic Study of Atherosclerosis (MESA). Stroke, 2008. 39(2): p. 329-335.
Weichert, W. and A. Werth, Early lung cancer with lepidic pattern: adenocarcinoma in situ, minimally invasive adenocarcinoma, and lepidic predominant adenocarcinoma. Current opinion in pulmonary medicine, 2014. 20(4): p. 309-316.
Williams MC, M.A., Nicol E, Newby DE, Cardiac CT Improves Outcomes in Stable Coronary Heart Disease: Results of Recent Clinical Trials. Current Cardiovascular Imaging Reports, 2017. 10(14).
Wong et al. "Imaging in Drug Discovery, Preclinical, and Early Clinical Development." J. Nuclear Med. 49.6(2008):26N-28N.
Yong, A.S., et al., The relationship between coronary artery distensibility and fractional flow reserve. PloS one, 2017. 12(7): p. e0181824.
Yoon, Y.E., et al., Noninvasive diagnosis of ischemia-causing coronary stenosis using CT angiography: diagnostic value of transluminal attenuation gradient and fractional flow reserve computed from coronary CT angiogaphy compared to invasively measured fractional flow reserve. JACC: Cardiovascular Imaging, 2012. 5(11): p. 1088-1096.
Yoshida, K., et al., Characterization of Carotid Atherosclerosis and Detection of Soft Plaque with Use and Black-Blood Mr Imaging. American Journal of Roentgenology, 2008. 29: p. 868-874.
Zainon, R., et al., Spectral CT of carotid atherosclerotic plaque: comparison with histology. European radiology, 2012. 22(12): p. 2581-2588.
Zavodni et al. "Carotid Artery Plaque Morphology and Composition in Relation to Incident Cardiovascular Events: The Multi-Ethnic Study of Atherosclerosis (MESA)." Radiol. 271.2(2014):361-389.
Zhao, Q., et al., Association between coronary artery calcium score and carotid atherosclerotic disease. Molecular medicine reports, 2013. 8(2): p. 499-504.
Zhao, Q., et al., Association of Coronary Calcification and Carotid Artery Morphology: a High Resolution Magnetic Resonance Imaging Study. Proc. Intl. Soc. Mag. Reson. Med. 17, 2009. 17: p. 27.
Zhao, Q., et al., Correlation of Coronary Plaque Phenotype and Carotid Atherosclerotic Plaque Composition. The American Journal of the Medical Sciences, 2011. 342(6): p. 480-485 10.1097/MAJ.0b013e31821caa88.
Zhao, X., et al., Discriminating carotid atherosclerotic lesion severity by luminal stenosis and plaque burden: a comparison utilizing high-resolution magnetic resonance imaging at 3.0 Tesla. Stoke, 2011. 42(2): p. 347-53.
International Search Report & Written Opinion on co-pending International patent application No. PCT/US16/67463 dated Mar. 10, 2017. (10 pages).

* cited by examiner

SYSTEMS AND METHODS FOR ANALYZING PATHOLOGIES UTILIZING QUANTITATIVE IMAGING

CROSS REFERENCE TO RELATED APPLICATIONS

The subject Application claims priority to U.S. Provisional Application Ser. No. 62/447,457, filed Jan. 18, 2017 and entitled "SYSTEMS AND METHODS FOR ANALYZING PATHOLOGIES UTILIZING QUANTITATIVE IMAGING."

STATEMENT REGARDING FEDERALLY SPONSORED RESEARCH OR DEVELOPMENT

This work supported in part by ID 1353532 awarded by NSF and the government may have certain rights to the work ID 10025457 awarded by NIH.

BACKGROUND OF THE INVENTION

The present disclosure related to quantitative imaging and analytics. More specifically, the present disclosure relates to systems and methods for analyzing pathologies utilizing quantitative imaging.

Imaging, particularly with safe and non-invasive methods, represents the most powerful methods for locating the disease origin, capturing its detailed pathology, directing therapy, and monitoring progression to health. Imaging is also an extremely valuable and low cost method to mitigate these human and financial costs by allowing for appropriate early interventions that are both less expensive and disruptive.

Enhanced imaging techniques have made medical imaging an essential component of patient care. Imaging is especially valuable because it provides spatially- and temporally-localized anatomic and functional information, using non- or minimally invasive methods. However, techniques to effectively utilize increasing spatial and temporal resolution are needed, both to exploit patterns or signatures in the data not readily assessed with the human eye as well as to manage the large magnitude of data in such a way as to efficiently integrate it into the clinical workflow. Without aid, the clinician has neither the time nor often the ability to effectively extract the information content which is available, and in any case generally interprets the information subjectively and qualitatively. Integrating quantitative imaging for individual patient management as well as clinical trials for therapy development requires a new class of decision support informatics tools to enable the medical community to fully exploit the capabilities made possible with the evolving and growing imaging modalities within the realities of existing work flows and reimbursement constraints.

Quantitative results from imaging methods have the potential to be used as biomarkers in both routine clinical care and in clinical trials, for example, in accordance with the widely accepted NIH Consensus Conference definition of a biomarker. In clinical practice, quantitative imaging are intended to (a) detect and characterize disease, before, during or after a course of therapy, and (b) predict the course of disease, with or without therapy. In clinical research, imaging biomarkers may be used in defining endpoints of clinical trials.

Quantification builds on imaging physics developments which have resulted in improvements of spatial, temporal, and contrast resolution as well as the ability to excite tissues with multiple energies/sequences, yielding diverse tissue-specific responses. These improvements thereby allow tissue discrimination and functional assessment, and are notably seen, for example, in spectral computed tomography (spectral CT), multi-contrast magnetic resonance imaging (multi-contrast MRI), ultrasound (US), and targeted contrast agent approaches with various imaging modalities. Quantitative imaging measures specific biological characteristics that indicate the effectiveness of one treatment over another, how effective a current treatment is, or what risk a patient is at should they remain untreated. Viewed as a measurement device, a scanner combined with image processing of the formed images has the ability to measure characteristics of tissue based on the physical principles relevant to a given imaging approach and how differing tissues respond to them. Though the image formation process differs widely across modalities, some generalizations help frame the overall assessment, though exceptions, nuances, and subtleties drive the real conclusions and until and unless they are considered some of the greatest opportunities are missed.

Imaging in the early phases of clinical testing of novel therapeutics contributes to the understanding of underlying biological pathways and pharmacological effects. It may also reduce the cost and time needed to develop novel pharmaceuticals and therapeutics. In later phases of development, imaging biomarkers may serve as important endpoints for clinical benefit. In all phases, imaging biomarkers may be used to select or stratify patients based on disease status, in order to better demonstrate therapeutic effect.

Continued improvement in the quality and effectiveness of medical care is needed to meet pressing demands as the population ages. For example,

1 killer: Cardiovascular disease. Atherosclerosis is the largest culprit. 50% vascular surgeries do not benefit the patient, while some that need surgeries don't get them. Blood markers or just determining stenosis just holds the status quo. Current tools analyze the lumen, but atherosclerosis is a disease of the wall. Atherosclerosis is a disease of the wall rather than the blood. Results in 45% misclassification and inability to measure response to drugs or provide early intervention

2 killer: Cancer. Lung cancer is the largest culprit. Early intervention reduces mortality, but uncertain diagnosis is a constraint. Lung cancer screening's potential for mortality reduction remains constrained by high burden of unnecessary costs. Just determining size of solid tissue holds the status quo. Current tools analyze solid tissue, but early cancer often manifests as sub-solid. Malignant cancer originates and spreads in sub-solid tissues. Results in 25% false positive rate which limits benefit by burdening the system with errors and inefficiencies Medical imaging is involved in some way with half of that (unnecessary services, $210B, inefficiently delivered services, 130B, and missed prevention opportunities, 55B), either because it is part of the problem, could be tapped as part of the solution, or stands in the balance between these possibilities given its primary use in diagnosis, staging, and surveillance.

Limitations of current image analysis tools lead to high rate of misclassification due to limitations in subjective and qualitative assessment using only a fraction of the information content in the images that are taken.

There is growing evidence that MR has the potential to examine components that have been demonstrated to contribute to atherosclerosis [1-4]. The components include: lipid core distinguished by presence of lipids, intermixed with extracellular matrix fibers and/or necrotic tissue; fibrosis demonstrated by intimal presence of dense, homogeneous/organized collagen extracellular matrix with smooth muscle cells/fibroblasts embedded, but no appreciable lipid or necrotic tissue; calcification, including its distribution through the tissue; intra-plaque hemorrhage; and vascular permeability, contributed by inflammation demonstrated by accumulations of macrophages and lymphocytes in the deeper regions of the plaque that may bridge the neointima and the media of the vessel and/or vascular leak, composed of endothelial permeability, neovascularization, necrosis, and collagen breakdown. Likewise CT has also been applied to this measurement task, particularly given the speed and structural measurement capability [5-9]. See section on dual energy and multi-spectral CT for coronary imaging; these methods could also be applied to peripheral vessels.

When, as is currently the case for cardiovascular diseases, the available markers for stratifying patients into risk categories are gross and unreliable, clinical trials of new therapeutic entities will inevitably be larger, more expensive and more likely to fail than would be the case with validated quantitative biomarkers for risk. This is because poor assessment of risk leads to clinical trial populations that are insufficiently homogeneous and which include meaningful numbers of subjects not truly at elevated risk. As a result, very large enrollments are necessary to achieve a statistically significant difference in outcomes between treatment and control groups even for a highly effective therapeutic. A validated biomarker that accurately identifies a high risk population, thereby excluding low risk subjects from enrollment in a trial, will enable a statistically significant demonstration of therapeutic efficacy in a smaller and consequently far less expensive trial; intelligent use of such biomarkers will also produce a higher probability of trial success—a major benefit for drug manufacturers.

Even prior to initiation of clinical trials, validated biomarkers for plaque characterization can play an important role in drug development. In preclinical work, researchers need to analyze animal models to evaluate the efficacy of drugs on plaque severity before moving forward with expensive human clinical trials. The ability to measure plaque hallmarks would be a significant drug development project de-risking and cost avoidance advantage.

Once used for subject assessment in trials, an imaging study that provides a validated biomarker for cardiovascular risk can serve as a companion diagnostic for the therapeutic. This model, well established with the use of genetic markers for stratifying patient populations in oncology trials and clinical care, creates a mutually beneficial synergy between diagnostic and therapeutic: for the drug developer, the diagnostic takes risk and expense out of the drug development/clinical trial process in return for a more narrowly defined patient population in clinical use; at the same time, the diagnostic becomes clinically mandated in order to qualify patients for the therapeutic and for monitoring response. A companion imaging study that is used to evaluate patients and predict the individual's response to a therapeutic can be a valuable component in a total solution offered by a pharmaceutical company to clinicians.

The principal limitations of current techniques include the difficulty in interpreting raw pixel reconstructed intensity values using simplistic thresholding operators. One aspect of this is that the physical imaging modality intrinsically limits the degree to which the pixel values are correct manifestations of the object being imaged, for example due to the fact that a given point is actually spread or blurred according to the finite physical characteristics of the imaging. A second aspect is that a given imaging modality or setup is only interrogating tissue using a limited excitation, and that despite the utility of multi-contrast MR on the one hand, or multi-energy CT on the other, that there is always some degree of non-specific response in the produced signal.

The present disclosure is directed to addressing these two limitations in a manner which lends itself to effective implementation.

SUMMARY

The present disclosure provides for improved image analysis. In particular, the systems and methods described herein relate to deblurring and segmentation of image data. The systems and methods advantageously account for and incorporate segmentation of biological analytes into a deblurring process for an image. Thus, the deblurring of the image may advantageously be optimized for enabling identification and quantitative analysis of one or more biological analytes based on underlying biological models for those analytes. The techniques described herein provide for significant improvements in the image deblurring and segmentation process which reduces signal noise and improves the accuracy of the image. Relative to existing techniques the present system and methods advantageously utilize unique optimization and tissue characteristics image models which may advantageously be informed by the underlying biology being analyzed, (for example by a biological model for the analytes). This provides for targeted deblurring and segmentation which is optimized for the applied image analytics.

In some embodiments, systems and methods for computer-implemented deblurring of an image may include acquiring a measured image using an imaging device; initializing a tissue characteristics image model for the measured image representing a true underlying image; solving an optimization problem using an iterative process which adjusts the tissue characteristics image model in order to minimize an energy function which models imaging physics relating to the appearance of different analytes in a Bayesian framework; and outputting a deblurred image. This deblurred image is advantageously optimized for segmentation and therefore for quantitative analysis of the biological analytes.

Notably, the tissue characteristics model may advantageously apply a level-set method (LSM) as a conceptual framework for numerical analysis of surfaces and shapes in the image representing biological analytes. Thus, the tissue characteristics model may advantageously map level sets to the image data via a set of characteristic equations thereby representing specific biological analytes. The characteristic equations may be utilized to solve the optimization problem to determine optimal transformation parameters for the tissue characteristics model, thereby optimizing deblurring for segmentation of the specific biological analytes being analyzed.

In some embodiments, the tissue characteristics image model provides a partitioning scheme for multi-phase level sets where analyte image regions are defined by characteristic functions as a function of level set functions for each tissue characteristic type. Notably, tissue characteristic types and analyte image regions are informed by an underlying biological model for the images biological system.

Given a multi-phase level set framework for the biological analytes, the iterative optimization proves may advantageously include the following steps. First, the characteristic functions from the level set functions for the current iteration may be calculated (e.g., based on the current level sets). Blurred character characteristic functions may then be calculated from the characteristic functions, e.g., based on a IIR Gaussian blurring given a point spread function (PSF) for the imaging device. Image intensity constants for the blurred characteristic functions may then be calculated. Finally, level set updates are calculated, e.g., based on a gradient descent approach to minimizing an energy function which models via a Bayesian framework imaging physics relating to the appearance of the biological analytes. Notably, the iterative process reinitializes the level sets and characteristic equations with every iteration.

The optimization problem described herein may utilize various probabilistic components as part of a Bayesian framework. Thus, in example embodiments the energy function may include an imaging physics component accounting for image intensities and a point spread function (PSF) of the imaging device. Furthermore, the energy function may advantageously include a prior probability component and/or a biological component. The prior probability component may advantageously weight the model toward the most likely configurations from prior distribution and away from physically and biologically unrealistic solutions while the biological component may advantageously incorporate non-imaging biological data, such as histology-driven knowledge of the structure and growth patterns of analytes.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

Figure 1:
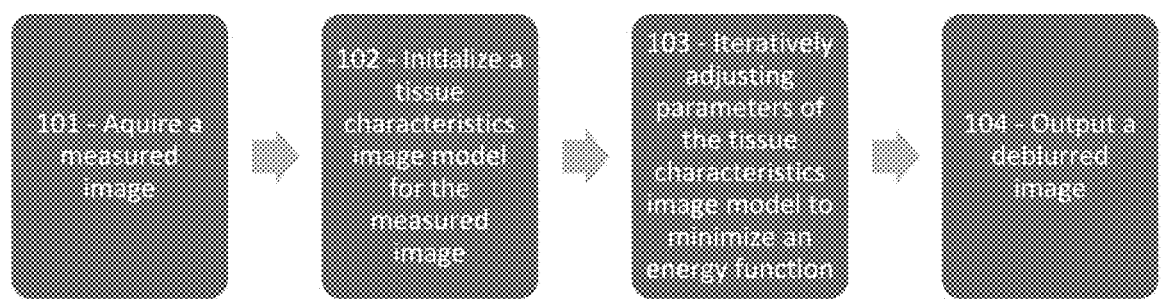
FIG. 1 depicts an example flow chart for deblurring/segmentation techniques described herein, according to the present disclosure.

The present disclosure provides improved image interpretation capabilities which enable robust interpretation of medical images taking into account the non-idealities of the scanning process as well as a detailed knowledge of biological properties in combination. Example embodiments may relate to vascular analyte analysis of CT and/or MR images. Significant challenges to this analysis are 1) the analyte regions are extremely small, sometimes sub-voxel, 2) the scanner may have significant spatial blurring relative to the size of the analyte regions, and 3) the analyte regions are located very close to other high contrast edges (i.e., lumen-wall interface) whose blur (proportional to the contrast difference) may significantly change the intensity values. These conditions lead to blurring artifacts that are of an equal or greater image intensity magnitude than the analytes contrast with the surrounding tissue. These and other issues are addressed by way of the present disclosure. Advantageously, in some embodiments, the systems and methods disclosed herein may utilize a biological model to improve and inform deblurring techniques.

Advantageously, the systems and methods of the present disclosure enable improved deblurring and segmentation of image data relating to biological analytes. In some embodiments, image data may be preferable CT, MM or other medical imaging data. The systems and methods of the present disclosure may advantageously be configured for analyzing imaging data to determine quantitative measurements for one or more biological analytes. These biological analytes may then be used to determine/identify pathology such as phenotyping. Thus, in some embodiments the systems and methods of the present disclosure may implement a multi-tiered hierarchical analysis of image data. See, e.g., U.S. Non-Provisional application Ser. No. 14/959,732, which is incorporated by reference herein.

As disclosed in U.S. Non-Provisional application Ser. No. 14/959,732, image analysis and feature extraction to determine one or more analyte regions may advantageously implement one or more biological models. In particular, the biological models may advantageously define one or more biological analytes which can be extracted from imaging data based on analysis of one or more imaging features. Importantly, the biological models may advantageously incorporate/account knowledge of the underlying biology being analyzed and therefore represent a first abstraction layer distinct from the underlying image data. Example models presented in U.S. Non-Provisional application Ser. No. 14/959,732 include biological models for analyzing vessels such as vascular and pulmonary vessels. Thus, e.g., analytes may include analytes relating to lesions and calcification regions for the imaged vessel. In some embodiments, image analysis may include biological analytes for a vessel or group of vessels or for a particular feature such as a lesion or calcification region for a vessel. Data analytics may further drill down to analysis of a particular, cross-section or region of a vessel, or particular subset of pixels from the original image. Other example biological models disclosed relate to CT angiography. Notably, the disclosed applications (e.g., VascuCAP and LungCAP) are exemplary and the systems and methods of the present disclosure may be adapted for quantitative analysis of biological analytes for imaging of any biological system. Thus, in general, the systems and methods described herein may advantageously provide for improved deblurring and segmentation of image data having one or more image regions representing one or more biological analytes.

In some embodiments, non-imaging data, such as histological data may be cross-references, e.g., co-registered with respect to imaging data (such as with respect to one or more biological analytes of the imaging data). Thus, as disclosed in U.S. Non-Provisional application Ser. No. 14/959,732 in some embodiments, a common coordinate reference system may be used to relate biological analytes from imaging data to biological analytes from non-imaging data (such as biological analytes from a histological data set). This common coordinate reference system may be implemented via the biological models. In some embodiments, the common coordinate reference system may include a coordinate transform between a coordinate system for histological data set and a coordinate system for an image data set (such as a CT or MRI image data set). In particular, the coordinate transform may include transform parameters for reregistering common biological features between the two data sets. Thus, for example in some embodiments histology data may be registered with respect to a particular vessel cross-section. Furthermore, since histological slides often warp the geometric morphology of the underlying biological structure, geometric transform parameters may also be determined and applied.

As noted above, the present disclosure provides for improved image analysis. In particular, the systems and methods described herein relate to deblurring and segmentation of image data. The systems and methods advantageously account for and incorporate segmentation of biological analytes into a deblurring process for an image. Thus, the deblurring of the image may advantageously be optimized for enabling identification and quantitative analysis of one or more biological analytes based on underlying biological models for those analytes. The techniques described herein provide for significant improvements in the image deblurring and segmentation process which reduces signal noise and improves the accuracy of the image analysis techniques described herein and described in U.S. Non-Provisional application Ser. No. 14/959,732. Relative to existing techniques the present system and methods advantageously utilize unique optimization and tissue characteristics image models which may advantageously be informed by the underlying biology being analyzed, (for example by a biological model for the analytes). This provides for targeted deblurring and segmentation which is optimized for the applied image analytics.

In some embodiments, systems and methods for computer-implemented deblurring of an image may include the following steps. First an imaging device (such as an MRI or CT device) may be used to acquire a measured image. A tissue characteristics image model may then be initialized for the measured image representing a true underlying image f. Notably, the tissue characteristics model may advantageously apply a level-set method (LSM) as a conceptual framework for numerical analysis of surfaces and shapes in the image representing biological analytes. Thus, the tissue characteristics model may advantageously map level sets to the image data via a set of characteristic equations thereby representing specific biological analytes. The characteristic equations may be utilized to solve an optimization problem to determine optimal transformation parameters for the tissue characteristics model, thereby optimizing deblurring for segmentation of the specific biological analytes being analyzed. Thus, both the tissue characteristics model and the optimization parameters may advantageously account/make use of a knowledge base of the underlying biology of the system, e.g., based on biological models for the analytes. The optimization problem may be solved using an iterative process which iteratively adjusts the tissue characteristics image model in order to minimize an energy function which models imaging physics relating to the appearance of different analytes in a Bayesian framework (the energy may be the negative log of probabilities for the Bayesian framework integrated over the image). Finally, a deblurred image may be outputted based on the transform parameters determined from the optimization problem. Notably, this deblurred image advantageously includes deblurring which is optimized for segmentation and therefore for quantitative analysis of the biological analytes. Thus, this represents a significant improvement over generalized deblurring techniques that have not accounted for the underlying biology of the system being analyzed.

Advantageously, in some embodiments, the tissue characteristics image model provides a partitioning scheme for multi-phase level sets where analyte image regions are defined by characteristic functions as a function of level set functions for each tissue characteristic type. Notably, tissue characteristic types and analyte image regions are informed by an underlying biological model for the images biological system. Thus, given a multi-phase level set framework for the biological analytes, the iterative optimization proves may advantageously include the following steps. First, the characteristic functions from the level set functions for the current iteration are calculated (e.g., based on the current level sets). Notably, the characteristic functions may be spatially regularized (e.g., using Gaussian-based regularization) and therefore may implement a regularization parameter such as described herein. Blurred character characteristic functions may then be calculated from the characteristic functions, e.g., based on a IIR Gaussian blurring given a point spread function (PSF) for the imaging device. Image intensity constants for the blurred characteristic functions may then be calculated (notably, these image intensity constants as well as the PSF for the imaging device may also be defined by the tissue characteristics image model). Finally, level set updates are calculated, e.g., based on a gradient descent approach to minimizing an energy function which models via a Bayesian framework imaging physics relating to the appearance of the biological analytes. The iterative process reinitializes the level sets and characteristic equations with every iteration. Thus, a signed distance property of the level set functions is relaxed during each iteration until reinitialization after the iteration.

Advantageously the tissue characteristic model as applied herein may be piecewise smooth and piecewise constant true underlying unblurred imaging intensity. Thus, the partitioning scheme for the multi-phase level sets may be selected so that every point within the domain belongs to one and only one region. Each characteristic function may be defined to be disjointed relative to the other characteristic functions to avoid overlap. Furthermore, one of the characteristic functions may define a background image region disjointed to all other characteristic functions. Notably, unlike level sets for biological analytes the level set for the background image region may include a number or discontiguous image regions. Thus, the level set for the background image region may be advantageously characterized as any part of the image that is not designated by the other level sets (i.e., the background level set rather than being independently defined, is defined by virtue of the remainder from all other level sets).

The systems and methods of the present disclosure also provide improved technique for identifying analyte regions. In particular, in some embodiments, candidate analyte regions may be evaluated using a morphological watershed applied to an inverted image. Using the morphological watershed, basins less than a threshold of hydrologic units deep are merged with neighboring regions. The watershed image is then masked to eliminate pixels below a watershed threshold. An upper range (e.g., $95^{th}$ percentile or other percentile) value within each region in the watershed image is computed and a per-region threshold is determined which is between (e.g., halfway between) the upper range percentile value and a value for the image background. Notably, the per-region threshold is selected to be greater than the watershed threshold applied to mask the image. Finally, the per-region threshold is applied to threshold the image and the image is reinitialized as a signed distance function.

As noted above, in some embodiments the image is of a vascular or pulmonary vessel, wherein the level set functions include a first level set for the vessel lumen and each contiguous region representing an analyte is initialized as its own level set. In some embodiments, the analyte regions may represent calcification regions. In further embodiments, the analyte regions further include lipid-rich necrotic core (LRNC) and intraplaque hemorrhage (IPH). U.S. Non-Provisional application Ser. No. 14/959,732 as well as the appendices to the provisional application for the subject application provide more detailed examples of specific implementations and applicability of the image analysis techniques described herein (including providing a detailed description of corresponding biological analytes and biological models for specific implementations).

While deblurring/segmentation techniques are generally described herein with respect to a signal pass type implementation, it should be noted that in some embodiments, it may be advantageous to use multiple passes of deblurring/segmentation. In particular, it should be noted optimized deblurring and segmentation may be different for different biological analytes. For example, in some embodiments, high contrast and low contrast biological analytes may be analyzed using separate or serial deblurring/segmentation passes. Thus, for example in some embodiments, deblurring and segmentation may be performed for analytes representing high-contrast bright regions followed by sub-pixel thresholding on the deblurred image and a second pass deblurring and segmentation and segmentation of low-contrast regions.

Advantageously, the optimization problem described herein may utilize various probabilistic components as part of a Bayesian framework. Thus, in example embodiments the energy function may include an imaging physics component accounting for image intensities and a point spread function (PSF) of the imaging device. Advantageously, the energy function may further include a prior probability component and/or a biological component.

The prior probability component may advantageously weight the model toward the most likely configurations from prior distribution and away from physically and biologically unrealistic solutions. Thus, in some embodiments, prior probability may be modeled with respect to tissue characteristic region boundaries, true deblurred tissue characteristic image intensities, and scanner blur (e.g., where the prior probabilities of each are either independent or dependent on one another). Advantageously, in further embodiments, prior probability component may model a priori probability of each pixel belonging to a given tissue characteristic class and a priori smoothness of the boundary, represented with curvature. In some implementations, the prior probability component may model each of the following: (i) tissue characteristic prior probability, (ii) curvature prior probability, and (iii) the tissue characteristic image intensity prior probability. The tissue characteristic prior probability at a given pixel is a weighted average of the tissue characteristic category priors weighted by characteristic functions for the for the tissue characteristics image model. The curvature prior probability is defined using an exponential distribution over a gradient magnitude of the characteristic functions. Furthermore, the curvature prior probability uses an offset appropriate for volume preserving flows, which subtracts the mean (over each contour) sum of curvatures of the contour from the computed sum of curvatures at each point. Finally, the tissue characteristic image intensity prior probability constants and point spread function (PSF) width is assigned a mostly flat distribution to constrain their range and, in the case of the intensity constants, their relative ordering. The mostly flat distribution is chosen to have infinite support so that if the value does stray outside of the expected range during iterations, it may return.

Notably, the inclusion of a prior probability component provides a smart/learning component to deblurring/segmentation which enables the system to continue to improve deblurring/segmenting of specific biological analytes. Thus, the prior probability may advantageously incorporate physical and biological knowledge from previous analytics to better customize the deblurring/segmentation for a specific implementation. This represents a significant departure and improvement on prior standardized deblurring techniques which typically do not look as post probabilities leading to improved deblurring and image segmentation.

As noted above, the energy function may further include a biological component. The biological component may advantageously incorporate histology-driven knowledge of the structure and growth patterns of analytes. Thus, in some embodiments, the biological component may advantageously make use of cross-registration of biological analytes between an image data set and a histological data set. Notably, the histological data set may be used to inform probabilities of various morphological characteristics of the biological analytes in the imaging data set and may therefore be used to improve the deblurring/segmentation process. While histological data is one example of non-imaging biological type data which may be including in the deblurring model it should be noted that other biological type data including objective data such as laboratory tests and even subjective data such as visual observations may be utilized. Furthermore, in some embodiments, the biological component may account for both current and past biological data (e.g., a current histological data set for the patient in question as well as past probabilities from prior histological data sets).

The inclusion of a biological component, similar to the inclusion of a prior probability component provides for better customization of the deblurring/segmentation process to a specific implementation, e.g., to analyzing a specific set of biological analytes. This in turn provides for a better signal to noise ratio and improved image analytics. The inclusion of a biological component in the probability is again a significant departure and improvement on prior standardized deblurring techniques which typically do not look at underlying biology.

Various advantages and improvements are provided by the systems and methods disclosed herein. In particular, the systems and methods disclosed herein may advantageously remove blur that derives from very bright as well as very dark signals. Unlike conventional techniques, this may advantageously, account for both the technical image formation process in the scanner, as well as the specific biology being imaged. The systems and methods disclosed herein may also advantageously derive scanner blur based on the image. In addition, the systems and methods disclosed herein may advantageously incorporate detailed statistical models of prior estimates of tissue characteristics drawn from a truth source, e.g., such as histopathology. In some embodiments, prior estimates may be used inform the classification process so as to provide the most plausible explanation for the observed image data. The purpose of all of the above aspects/improvements is to provide increased accuracy in readings of biological analytes, e.g., that include cross-sectional areas, volumes, and spatial locations for different types of tissues. While examples given are for vascular plaques it would be appreciated by a person of ordinary skill in the art, the approach may be generalizable to other types of tissues.

FIG. 1, depicts an example flow chart for the deblurring/segmentation techniques described herein. At step 101, an imaging device is used to acquire a measured image. Next, at step 102, a tissue characteristics image model may then be provided/initialized for the measured image, the tissue characteristics image model representing a true underlying image f. Next at step 103, an optimization problem is be solved using an iterative process which iteratively adjusts the tissue characteristics image model in order to minimize an energy function which models (in a Bayesian framework) imaging physics relating to the appearance of different analytes. Finally, at step 104 a deblurred image may be outputted based on the transform parameters determined from the optimization problem.

Figure 2:
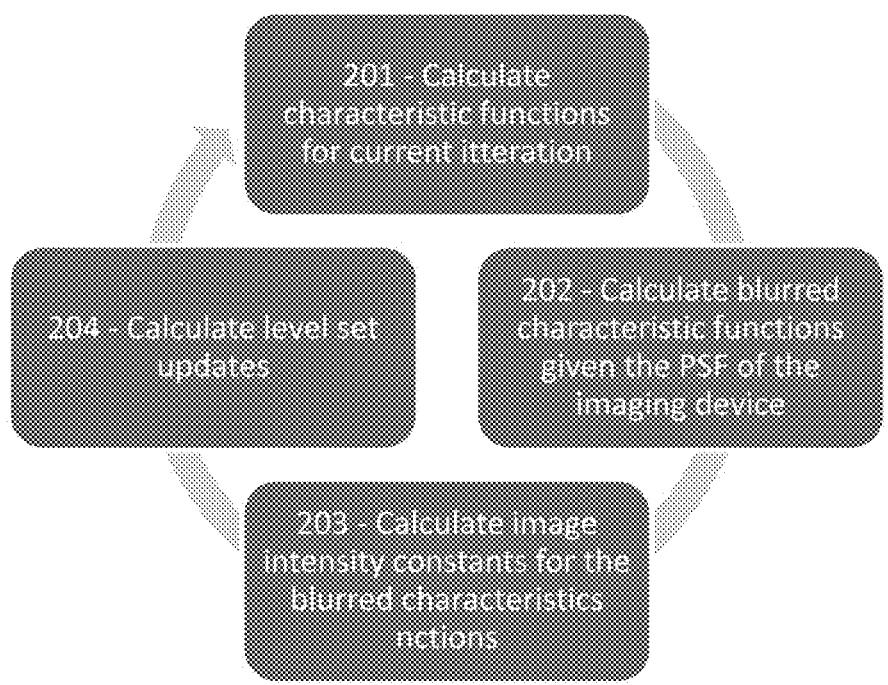
FIG. 2 depicts an example flow chart for an iterative optimization algorithm described herein, according to the present disclosure.

FIG. 2, depicts an example flow chart illustrating substeps of the iterative optimization algorithm step (e.g. step 103 of FIG. 1) as applied within the context of multi multi-phase level sets where analyte image regions are defined by characteristic functions as a function of level set functions for each tissue characteristic type. At step 201, the characteristic functions from the level set functions for the current iteration are calculated (e.g., based on the current level sets). Next, at step 202, blurred character characteristic functions may be calculated from the characteristic functions, e.g., based on a IIR Gaussian blurring given a point spread function (PSF) for the imaging device. At step 203, image intensity constants for the blurred characteristic functions may be calculated. Finally, at step 204, level set updates are calculated, e.g., based on a gradient descent approach to minimizing an energy function which models via a Bayesian framework imaging physics relating to the appearance of the biological analytes. The iterative process reinitializes the level sets and characteristic equations with every iteration (e.g., prior to repeating steps 201-204). Thus, a signed distance property of the level set functions is relaxed during each iteration until reinitialization after the iteration.

Figure 3:
FIG. 3 depicts blurring of an acquired image, according to the present disclosure.
Figure 4A:
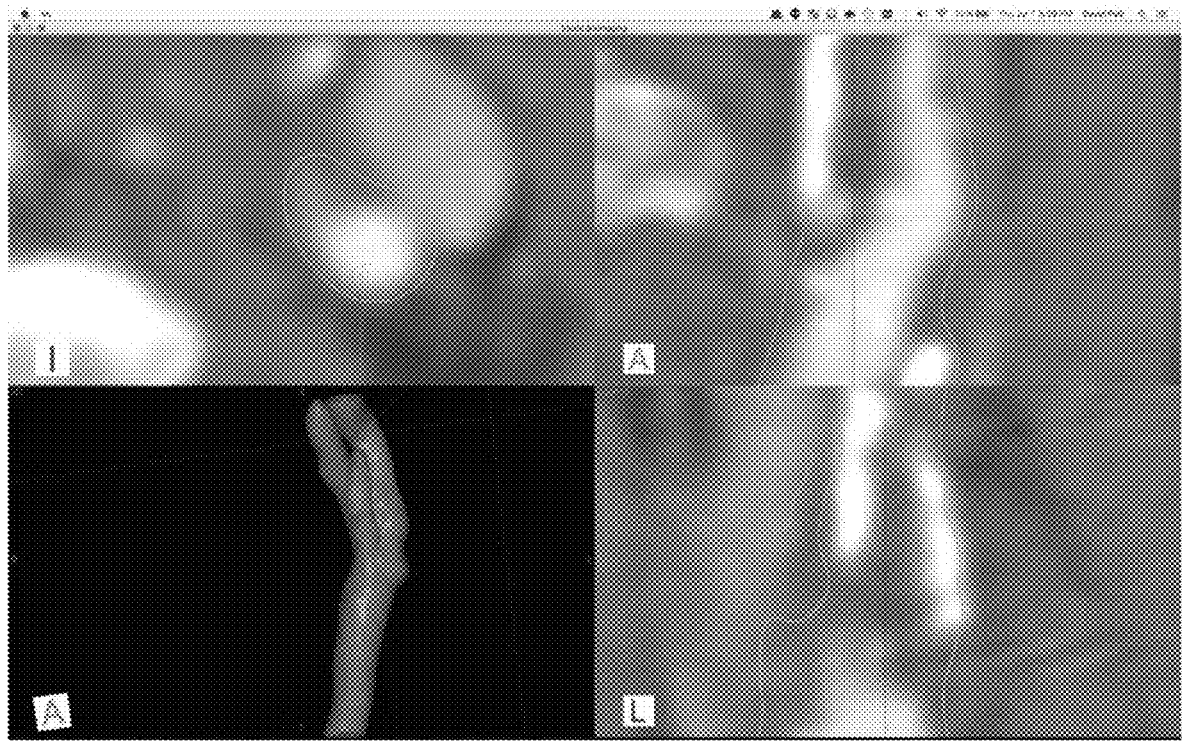
FIGS. 4A-B and 5A-B depict example images before (4A and 5A) and after (4B and 5B) applying the segmentation/deblurring techniques described herein, according to the present disclosure.
Figure 4B:
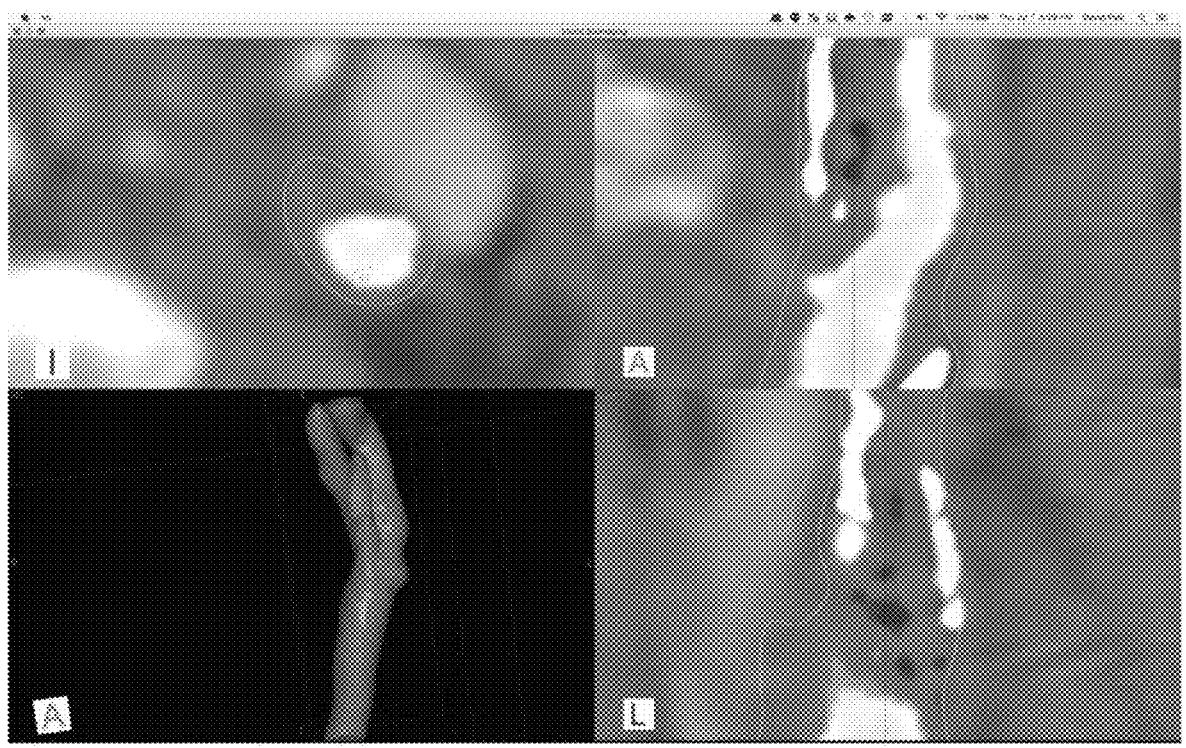
Figure 5A:
Figure 5B:
Figure 6:
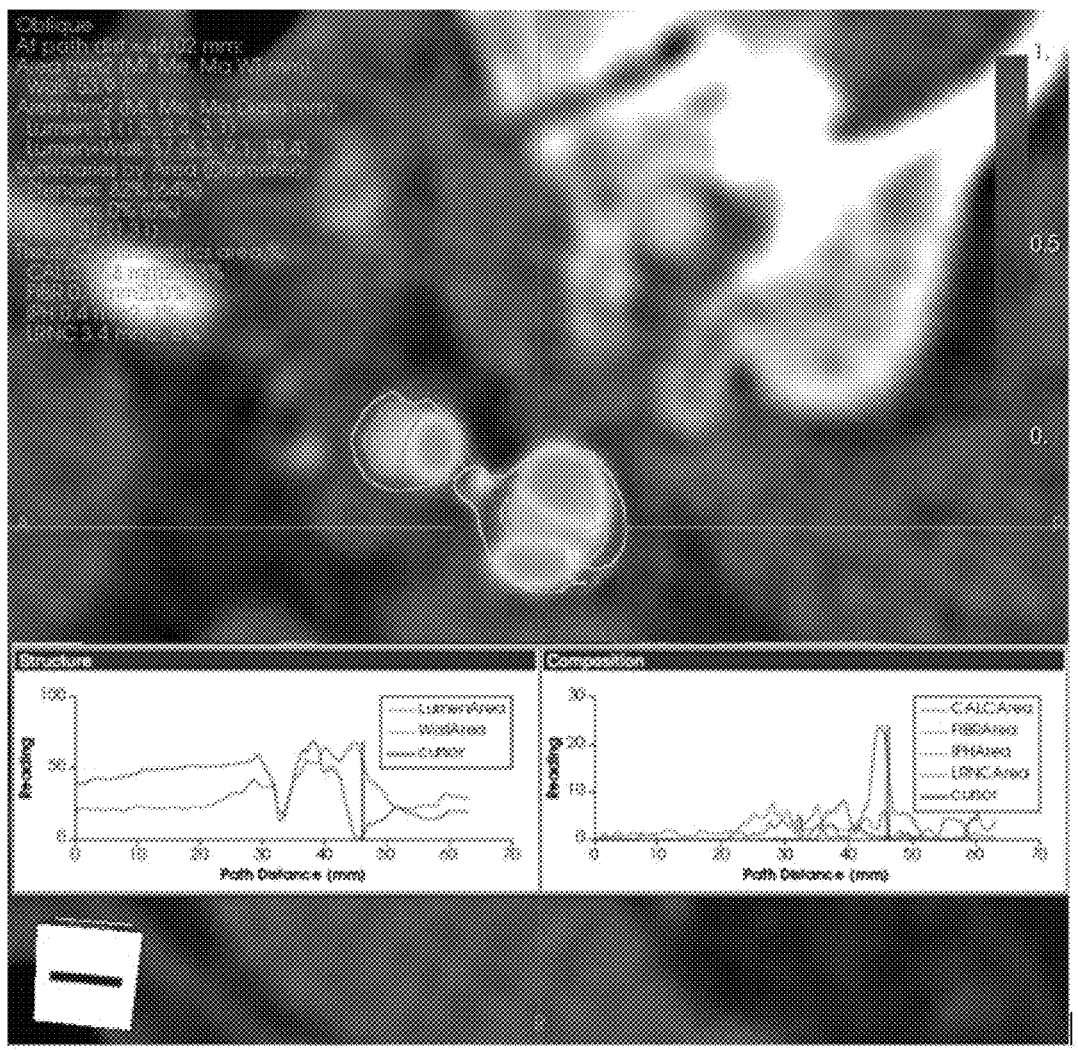
FIG. 6 depicts an example augmented deblurred image, according to the present disclosure.

FIGS. 3, 4A-B and 5A-B illustrates the effectiveness of the deblurring/segmentation techniques disclosed herein. In particular, FIG. 3 depicts an acquired image which includes blurring. FIGS. 4A-B and FIGS. 5A-B next illustrate the impact of deblurring and segmentation depicted acquired images in FIGS. 4A and 5A and depicting corresponding deblurring and segmenting of these images in FIGS. 4B and 5B. As shown in the figures the deblurring/segmentation techniques disclosed herein advantageously provide for improved recognition of biological analytes. Notably in some embodiments, a deblurred image may further be augmented by replacing segmented regions representing biological analytes with an overlay map (e.g., a color-coded overlay map) for the segmented regions. FIG. 6 depicts an example augmented deblurred image. The augmented deblurred image may further depict quantitative measurements associated with identified analyte regions as well as one or more graphical characterizations of structure and/or composition. Thus, the augmented deblurred image may advantageously provide improved tools for a clinician to evaluate a pathology of the patient.

The following sections provide a more detailed description of the deblurring and segmentation techniques described herein. Whereas many alterations and modifications of the disclosure will no doubt become apparent to a person of ordinary skill in the art after having read the description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

General Techniques Relating to Deblurring and Segmentation

Terminology and Techniques Related to Deblurring

Deblurring Model.

Deblurring approaches may typically model the blurring process as a linear and spatially invariant process [10]. The measured image, g, is equal to the true underling image, f, convolved with the point spread function (PSF) [11], h, of the scanner to produce the blurred image reconstructed by the scanner. Noise is often modeled as an additive white Gaussian process [12], n.

$$g=h*f+n$$

Least Squares [13].

By restacking the columns and rows of the image into a single vector, the problem can be posed with linear algebra as a singular value decomposition problem [14]. However, this approach is very sensitive to perturbations and is not robust to noise since deblurring is an ill-posed inverse problem. Regularization (e.g., Tikhonov [15]) can reduce but not eliminate this problem.

Deconvolution [16].

Deconvolution represents another approach that can be thought of in the Fourier domain as:

$$F=H/G$$

Wiener deconvolution [17] is a linear and non-iterative approach that minimizes the mean squared error between the original signal and the deconvolved signal. It works in the frequency domain and requires knowledge of the blurring kernel (PSF) and the mean power spectral density of the noise, sometimes specified by the noise variance. Tikhonov-Miller deconvolution adds regularization in the form a squared norm on the deconvolved image, which weights against extreme pixel values and thus amplification of noise. While applicable in some domains, one of the artifacts of these types of deconvolution is that artifactual high frequency fluctuations are added to the deconvolved image. This is particularly detrimental for our application of finding subtle intensity variations due to small vascular analyte regions. Richardson-Lucy deconvolution [18] is an iterative approach that uses a known PSF and makes the assumption of Poisson noise to model scanner shot noise. Blind deconvolution is deconvolution performed without explicit knowledge of the scanner PSF.

Of particular importance is the fact that these types of deblurring approaches make no assumptions on the underlying true image content or structure.

Terminology and Techniques Intensity Based Segmentation

Chan and Vese Segmentation.

The Chan and Vese method [19] uses the Mumford Shah functional [20] with the simplifying constraint of a piecewise constant image model. There are (at least) two data fidelity terms for inside and outside the contour along with penalty terms for length and area.

$$E(c_1, c_2, C) = \mu \cdot \text{Length}(C) + v \cdot \text{Area}(\text{inside}(C)) + \lambda_1 \int_{\text{inside}(C)} (I - c_1)^2 dA + \lambda_2 \int_{\text{outside}(C)} (I - c_2)^2 dA$$

Note that in a 3D level set, "Length" is actually surface area and "Area" is actually volume. Using a level set formulation for the curve C, (compared to original paper, we have change the convention to negative interior level set representations here) one gets:

$$\text{Length}(\phi = 0) = \int_\Omega |\nabla H(-\phi)| dA = \int_\Omega -\delta(-\phi)|\nabla \phi| dA$$

$$\text{Area}(\phi \leq 0) = \int_\Omega H(-\phi) dA$$

Where the Heaviside [21] and Dirac delta [22] functions can be regularized using sin- or atan-approximations of the true functions. By keeping $\phi$ fixed and minimizing the energy functional with respect to $c_1$ and $c_2$, these constants are simply the average image intensity within each region, respectively.

$$c_1 = \frac{\int_\Omega I \cdot H(-\phi) dA}{\int_\Omega H(-\phi) dA}$$

$$c_2 = \frac{\int_\Omega I \cdot (1 - H(-\phi)) dA}{\int_\Omega (1 - H(-\phi)) dA}$$

And the Euler-Lagrange equation [23] can be parameterized with an artificial time variable to get:

$$\frac{\partial \phi}{\partial t} = -\delta(-\phi)\left[\mu \cdot div\left(\frac{\nabla \phi}{|\nabla \phi|}\right) - v - \lambda_1(I - c_1)^2 + \lambda_2(I - c_2)^2\right]$$

Notably, this method works well as long as the piecewise constant assumption of the model holds up which is true so long as the scanner blurring is negligible compared to the region size.

Multi-Phase Chan and Vese Segmentation.

For multi-phase (negative interior) level sets the equation becomes:

$$E(c_i^{in}, c_i^{out}, C) = \int_\Omega \sum_{i=1}^{n} \left[\lambda_{1,i} H(-\phi_i)(I(x) - c_i^{in})^2 + \right.$$

$$\lambda_2 (1 - H(-\phi_i))\prod_{j \neq i}(1 - H(-\phi_j))(I(x) - c_i^{out})^2 +$$

$$\left. \mu |\nabla \phi_i|\delta(-\phi_i) + \alpha H(-\phi_i) + \ldots + \gamma \sum_{j \neq i} H(-\phi_i)H(-\phi_j)\right] dA$$

The last term weights against overlapping regions. The background region is implicit. Note that each region has its own inside and outside intensity constants (i.e., outside intensity constants are not gathered from other regions' inside constants). The inside and outside intensity constants are chosen to be the average values inside and outside of C respectively.

The Euler Lagrange equation for updating the level sets is:

$$\frac{\partial \phi_i}{\partial t} = \delta(-\phi_i)\left[\lambda_{1,i}(I(x) - c_i^{in})^2 - \lambda_2 \prod_{j \neq i}(1 - H(-\phi_j))(I(x) - c_i^{out})^2 + \right.$$

$$\left. \mu div\left(\frac{\nabla \phi_i}{|\nabla \phi_i|}\right) + \alpha + 2v(\text{Volume} - V_0) + \gamma \sum_{j \neq i} H(-\phi_j)\right]$$

Terminology and Techniques Simultaneous Image Restoration (Deblurring) and Segmentation It has been noted that image deblurring can be facilitated by knowledge of the imaging system PSF and that the blurring kernel can be estimated from the profiles of known images. And conversely, image segmentation can be facilitated by accurate image deblurring.

Kim et al. describe a method for simultaneous image restoration and segmentation [24]. They pose the segmentation problem using the Mumford Shah functional limiting discontinuities to closed curves:

$$E_O(f, C) = \beta \int_\Omega (f - g)^2 dA + \alpha \int_{\Omega \setminus C} |\nabla f|^2 dA + \gamma \oint_C ds$$

where $\Omega$ is the image region and B is the region boundary. f is the piecewise smooth image model and g is the measured image. The first data fidelity term penalizes image-model mismatch. Note that it is proportional to the negative log likelihood of the image under a white Gaussian noise model. The second term model non-smoothness. The third term penalizes long boundaries. By explicitly considering the known system PSF, they then solve:

$$E(f, C) = \beta \int_\Omega (h * f - g)^2 dA + \alpha \int_{\Omega \setminus C} |\nabla f|^2 dA + \gamma \oint_C ds$$

At each stage of iteration they:
1. Restoration: Compute f that minimizes E(f, C) given C.
   a. The first and second terms together present a least square minimization with Tikhononv regularization (the second term)
2. Segmentation: Evolve C along negative gradient of E(f, C).
   a. Level set evolution according to Euler Lagrange solution to Mumford Shah functional.

For regularization of the Heaviside and Dirac delta functions applied to the level set functions, they choose the following function with finite support:

$$H_\varepsilon(x) = \text{abs}(z < 1)\frac{1}{2}\left(1 - \frac{x}{\varepsilon} + \sin\left(-\frac{\pi x}{\varepsilon}\right)\right)$$

$$\delta_\varepsilon(x) = \frac{dH_\varepsilon}{dx} = -\frac{1}{\varepsilon \cos\left(\frac{\pi x}{\varepsilon}\right)}$$

Another more popular choice is to select a regularizer with infinite support such as the following. The infinite support is allows for a greater possibility of finding globally optimal solutions over locally optimal solutions albeit at the expense of the accuracy of modeling the PSF of the imaging system.

$$H_\varepsilon(x) = \frac{1}{2} + \frac{\tan^{-1}\frac{x}{\varepsilon}}{\pi}$$

$$\delta_\varepsilon(x) = \frac{1}{\varepsilon\pi\left(1 + \frac{x^2}{\varepsilon^2}\right)}$$

Bar et al. described a method for simultaneous image restoration and segmentation [25]. They combine Mumford Shah segmentation with semi-blind deconvolution with an isotropic Gaussian kernel of unknown width.

Smith et al. applied simultaneous segmentation and deconvolution to dynamic PET imaging [26]. The use a multi-phase Chan and Vese level set assuming piecewise constant regions at each dynamic timepoint.

Kallel et al. describe joint image restoration and segmentation in terms of the game theoretic Nash equilibrium [27].

Characterizing the Tissue Characteristics Image Model:
Tissue Characteristics Image Model A tissue characteristics model is provided which advantageously enables inferences of structure and tissue characteristics of an atherosclerotic plaque given an acquired image (e.g., CT image) using knowledge of both the imaging acquisition process and of the biological formation of plaques within a Bayesian framework [28].

In order to limit degrees of freedom in this inverse problem, the latent model of tissue characteristic tissue characteristics, f, is not only piecewise smooth but also piecewise constant true underlying (i.e., unblurred) imaging intensity (similar to the Chan and Vese [19] segmentation model). Thus, the second term (region non-smoothness) in the Mumford Shah functional drops to zero and is ignored. However, in the first data fidelity term, the blurred region intensities are no longer algebraically/spatially independent from each other since the blur may extend slightly into the next region. The way in which this dependence is handled is one aspect of example embodiments of the systems and methods disclosure herein.

In example embodiments, the imaging system's point spread function (PSF) is assumed linear, anisotropic, spatially-invariant and Gaussian in shape with variance estimated as described previously.

A patient-specific plaque-model M may include 1) a level set $\phi_j$ for each tissue characteristic type that defines the tissue characteristic region boundary through the multi-region model described below, 2) the true, unblurred image intensities $c_i$ for each tissue characteristic type, and 3) the amount of blur in image acquisition process σ.

$$M=\{\phi_j,c_i,\sigma\} \text{ for } i\varepsilon[1 \ldots R], j\varepsilon[1 \ldots R-1]$$

Multi-Region Level Sets

Similar to Smith et al. and Mansouri et al. [29], a partitioning scheme for multi-phase level sets may be chosen that by definition avoids issues of overlap and vacuum. In other words, every point within the domain belongs to one and only one region. Each image region is defined by a characteristic function $\chi_i$ with $i\varepsilon[1 \ldots R]$ is ~1 inside and ~0 outside. This function is designed to have $C^1$-continuous soft shoulders rather than being discontinuously binary valued for the purposes of numerical regularization.

Each characteristic function is $\chi_i$ is a function of the level set functions $\phi_j$ with $j\varepsilon[1 \ldots R-1]$ that follow the negative interior convention and have $|\nabla\phi_j|=1$ almost everywhere. To avoid overlap, each $\chi_i$ is defined to be disjoint with each of the previous characteristic functions $\chi_j$ where j<i. Note that the level set functions may have significant overlap even though the characteristic functions will not. To avoid a vacuum, the last characteristic function with i=R is understood to be background and is defined as disjoint with all the others and thus does not have its own level set function. Thus, R characteristic functions $\chi_i$ are defined by R−1 level set functions $\phi_j$. By definition, the characteristic functions will sum to exactly 1 at every point in space.

The true, unblurred image intensity is modeled as constant for each contiguous region of a given tissue characteristic type (including background) and is denoted as $c_i$ with $i\varepsilon[1 \ldots R]$. Note that this means that two non-contiguous regions of the same analyte, e.g., CALC, will in general be modeled with different values of c. This is an important aspect of the model since our work has shown that these differences can be non-trivial. For notational convenience, $\delta_{i,j}$ is a Kronecker delta function [30] (not regularized), whereas $\delta_\varepsilon(\bullet)$ is a regularized Dirac delta function and defined as the derivative of $H_\varepsilon$. The spatially regularized characteristic functions $\chi_i$ and the unblurred image model f are given as follows.

$$\chi_i(\phi_1, \ldots, \phi_{R-1}) = H_\varepsilon(-\phi_i)^{1-\delta_{R,i}} \prod_{k=1}^{i-1}(1 - H_\varepsilon(-\phi_k))$$

$$f = \sum_{i=1}^{R} \chi_i \cdot c_i$$

Various parts of the algorithm utilize the partial derivatives of the characteristic functions w.r.t. the level sets, provided below.

$$\frac{\partial \chi_i}{\partial \phi_j} = \begin{cases} \delta_\varepsilon(-\phi_j)H_\varepsilon(-\phi_i)\prod_{k=1}^{i-1}(1-H_\varepsilon(-\phi_k))^{1-\delta_{k,j}} & i \neq R, j < i \\ -\delta_\varepsilon(-\phi_j)\prod_{k=1}^{i-1}(1-H_\varepsilon(-\phi_k)) & i \neq R, j = i \\ \delta_\varepsilon(-\phi_j)\prod_{k=1}^{R-1}(1-H_\varepsilon(-\phi_k))^{1-\delta_{k,j}} & i = R \\ 0 & j > i \end{cases}$$

Integration of Heaviside Regularization with Imaging Blur Model

Empirical testing has shown that the infinite support of the commonly used inverse tangent regularizer leads to a very broad, but low-intensity blurring effect that is not representative of real-world imaging systems. Thus, example embodiments may advantageously utilize a Gaussian-based regularization that is more compatible with true imaging systems and whose point spread function tends to be well approximated by a Gaussian due to the central limit theorem. A further advantage of the Gaussian regularization is that one is able to take advantage of the fact that multiple Gaussian convolutions are equivalent to a single Gaussian convolution whose variance is the sum of the individual variances. Because of this the amount of regularization blur with respect to the previously estimated point spread function may advantageously be accounted for. $\varepsilon=0.3$ mm is the standard deviation of Gaussian blur for regularization dependent only on the signed distance function of a region, $\sigma$ is the additional standard deviation of imaging blur that the algorithm attempts to correct for, and $\sigma_{PSF}$ is the total standard deviation of the PSF such that $\sigma_{PSF}^2=\varepsilon^2+\sigma^2$.

Note that this Gaussian regularization of step edges is closely approximated by convolution with a Gaussian kernel. It is not precisely equivalent since the former does not take into consideration the full geometry of the region since it is only based on the signed distance function. A point just outside a highly concave region will not get additive contributions from all surrounding points along the boundary. Thus, we strive to keep $\varepsilon$ low while achieving sufficient Heaviside regularization. In these equations, $\Phi_{normal}$ and $\phi_{normal}$ are the standard normal CDF and PDF, respectively.

$$H_\varepsilon(x) = \Phi_{normal}\left(\frac{x}{\varepsilon}\right) = \frac{1+erf\left(\frac{x}{\varepsilon\sqrt{2}}\right)}{2}$$

$$\delta_\varepsilon(x) = \frac{1}{\varepsilon}\phi_{normal}\left(\frac{x}{\varepsilon}\right) = \frac{1}{\varepsilon\sqrt{2\pi}}e^{-\frac{x^2}{2\varepsilon^2}}$$

At each iteration in the algorithm, an image map of each characteristic function $\chi_I$ may be maintained.

The Optimization Algorithm

Example of the Overall Algorithm

As noted above, disclosed herein are systems and methods which advantageously implement/utilize and algorithm that iteratively minimizes the energy functional by varying both the level set functions and the image region constants. Note that in some embodiments, handling the background region in real images may be difficult due to significant heterogeneity of the areas outside the region of interest (e.g., blood vessel lumen and wall). For instance, a partially contrast enhanced jugular vein may drag down the constant if included with arterial lumen. Thus, in example embodiments, the regions outside the wall may be masked with a preset value to avoid this problem. In one instance, the stopping criterion may be based upon one or more user-defined number of iterations. For example:

Initialize $\phi_i$ level set functions and $\chi_i$ characteristic functions

Initialize g with the background region masked to a constant intensity

Until stopping_criterion

Compute characteristic functions $\chi_i$

Compute blurred characteristic functions $h*\chi_i$

Compute constants $c_i$

Compute $d\phi_i/dt$ level set function updates

Create image f with partial volume effect at edges

Create image h*f

Volume fractions are computed from characteristic functions

Output deblurred image is provided as $I_{deblurred}=g-(h*f-f)$

Initialization of Level Sets

In some embodiments, one level set may be used for the entire vessel lumen initialized with the segmented lumen L. Each distinct contiguous bright region is initialized as its own level set and calculated as follows. Candidate bright regions are computed using a morphological watershed applied to the inverted image (to turn bright peaks into catchment basins). Basins less than 50HU deep are merged with neighboring regions. The watershed label image is masked to eliminate pixels below a threshold $T_{watershed}=250$ HU. Within each watershed region i, the $95^{th}$ percentile value, $I_{95}$, is computed and a per-region threshold is determined as halfway between $I_{95}$ and $T_{background}=70$ HU. This threshold is not allowed to be lower than $T_{watershed}$. The image I is then thresholded and reinitialized as a signed distance function.

$$T^i_{CALC} = \max\left(T_{watershed}, \frac{I_{95}+T_{background}}{2}\right)$$

$$S^i_{CALC} = \text{reinitialize}(T^i_{CALC}-I)$$

This allows for a level set to be assigned to the vessel lumen and to each putative region of CALC. Each region is represented within its own sub-volume and is calculated carefully so that even if sub-volumes overlap that regions belong solely to one region.

Energy Functional Modelling

Energy functional, as disclosed herein, models the imaging physics aspects of the appearance of different plaque components in a Bayesian framework, combining the evidence in the form of the blurred image and a prior distribution on the likelihood of a given model.

$$P(M|e_{phys}) = \frac{P(e_{phys}|M)P(M)}{P(e_{phys})}$$

$$E = -\int_\Omega \ln P(M|e_{phys})dV$$

$$= -\int_\Omega \left[\ln\frac{P(e_{phys}|M)}{P(e_{phys})} + \ln P(M)\right]dV$$

$$E = E_{phys} + E_{prior}$$

In example embodiments, Energy functional may advantageously represents a novel approach that integrates modeling between imaging physics and biology. The imaging physics portion accounts for image intensities and the PSF of the scanner while the biological portion of the model incorporates histology-driven knowledge of the structure and growth patterns of atherosclerotic plaques. The model prior weights the model toward the most likely configurations and away from physically and biologically unrealistic solutions. The model is provided in probabilistic terms and the energy is the negative log of probabilities integrated over the image. In addition to providing analytic tractability, the logarithm super-linearly weights against decreasing probability solutions. In example embodiments, a Naïve Bayes [31] domain independence assumption is made between imaging physics and biology, i.e., that the likelihood of the residual between blurred model and blurred acquired image does not depend on the biological likelihood of a configuration of tissue characteristic regions next to each other.

$$P(M|e_{phys},e_{biol}) = \frac{P(e_{phys},e_{biol}|M)P(M)}{P(e_{phys},e_{biol})} =$$

$$\frac{P(e_{phys}|M)}{P(e_{phys})} \cdot \frac{P(e_{biol}|M)}{P(e_{biol})} \cdot P(M) \text{ (domain independence assumption)}$$

-continued $$E = -\int_\Omega \ln P(M \mid e_{phys}, e_{biol}) dV$$

$$= -\int_\Omega \left[\ln \frac{P(e_{phys} \mid M)}{P(e_{phys})} + \ln \frac{P(e_{biol} \mid M)}{P(e_{biol})} + \ln P(M)\right] dV$$

$$E = E_{phys} + E_{biol} + E_{prior}$$

The various model parameters that are evolved throughout the algorithm include the level set functions mapped over the image, the true (deblurred) image intensity of different biological tissue characteristics, and the width of the scanner PSF. The pre-learned model parameters include the model of the dependencies of the spatial distribution of tissue characteristics with a plaque.

After initialization, the model is iteratively adjusted in order to minimize the energy function through a gradient descent trajectory. The gradient descent approach allows for the direct adjustment of model parameters, such as each level set $\phi$, in order to minimize energy.

$$\phi^{t+1} = \phi^t - \alpha \frac{\partial E}{\partial \phi} \quad \frac{\partial \phi}{\partial t} = -\frac{\partial E}{\partial \phi} \text{ (gradient descent)}$$

$$\frac{\partial \phi}{\partial t} = -\frac{\partial E}{\partial \phi} = -\left(\frac{\partial E_{phys}}{\partial \phi} + \frac{\partial E_{prior}}{\partial \phi}\right)$$

$$\phi^{t+1} = \phi^t - \alpha \frac{\partial E}{\partial \phi} \quad \frac{\partial \phi}{\partial t} = -\frac{\partial E}{\partial \phi} \text{ (gradient descent)}$$

$$\frac{\partial \phi}{\partial t} = -\frac{\partial E}{\partial \phi} = -\left(\frac{\partial E_{phys}}{\partial \phi} + \frac{\partial E_{biol}}{\partial \phi} + \frac{\partial E_{prior}}{\partial \phi}\right)$$

Imaging Physics Term

This term in the energy functional represents the L2 norm of the difference between the blurred idealized piecewise constant image and the acquired image. The coefficients allow for a balance between the effect of curvature evolution smoothing and minimizing the mode-to-image residual. The evidence variables are the acquired image pixel intensities represented by the blurred image g.

Within each iteration, the ordering of sub-steps follows the flow of information through the variables. The procedure is:

1. Compute characteristic functions $\chi$ (depends on $\phi$, $\varepsilon$),
2. Compute blurred characteristic functions $h*\chi$ (depends on $\chi$, $\sigma_x$, $\sigma_y$, $\sigma_z$),
3. Compute image intensity constants c (depends on $h*\chi$),
4. Compute level set updates $\partial\phi/\partial t$ (depends on g, X, c).

Compute Characteristic Functions and Blurred Characteristic Functions.

The characteristic functions are simply calculated from the level sets $\phi_j$ using the definitions provided above. The blurred characteristic functions are computed using IIR Gaussian blurring on the characteristic functions given the PSF estimate.

Compute Image Intensity Constants.

In order to solve for the constants at each iteration, the following elegant derivation is used as in Smith et al. [26]:

$$\frac{\partial E_{phys}}{\partial c_j} = \frac{1}{s^2} \int_\Omega \left(h * \sum_{i=1}^R \chi_i \cdot c_i - g\right)(h * \chi_j) dV = 0$$

$$\sum_{i=1}^R c_i \int_\Omega (h*\chi_i)(h*\chi_j) dV = \int_\Omega g(h*\chi_j) dV \text{ for } j \in [1 \ldots R]$$

This system of R equations with R variables ($c_i$) is solved by rewriting the equation above in matrix form and solving with standard square matrix inversion methods.

$$A_{ij} = \int_\Omega (h*\chi_j)(h*\chi_i) dV$$

$$b_i = \int_\Omega g(h*\chi_i) dV$$

$$Ac = b$$

$$c = A^{-1}b$$

The convolutions are performed using a recursive IIR smoothing filter [32] applied to each characteristic function separately so that $A_{ij}$ can be computed in linear time w.r.t. R, the number of regions.

Compute Level Set Updates.

The characteristic functions serve as an intermediary and the Euler-Lagrange equation is determined in terms of the level set functions. Unlike Smith et al., in example embodiments, the systems and methods disclosed herein do not include signed distance maintenance term $\int(|\nabla\phi|-1)^2$ since each level set function is explicitly reinitialized at each iteration. Also note that because of the piecewise constant modeling decision, one is not faced with the fundamental problem of distinguishing between image acquisition blur and blur in the actual scene itself as is done by Kim et al.

$$h = \frac{1}{\sigma_x \sigma_y \sigma_z (\sqrt{2\pi})^3} e^{-\left(\frac{x^2}{2\sigma_x^2} + \frac{y^2}{2\sigma_y^2} + \frac{z^2}{2\sigma_z^2}\right)}$$

$$f = \sum_{i=1}^R \chi_i \cdot c_i$$

$$h*f = \sum_{i=1}^R h*\chi_i \cdot c_i$$

$$P(e_{phys} \mid M) = \frac{1}{s\sqrt{2\pi}} e^{-\frac{(h*f-g)^2}{2s^2}}$$

$$\frac{P(e_{phys} \mid M)}{P(e_{phys})} = K_{phys} \cdot e^{-\frac{(h*f-g)^2}{2s^2}}$$

$$E_{phys} = \int_\Omega \left[\frac{(h*f-g)^2}{2s^2} - \ln K_{phys}\right] dV$$

$$\frac{\partial E_{phys}}{\partial \phi_j} = \frac{1}{s^2} \int_\Omega (h*f-g)\left(h*\frac{\partial f}{\partial \phi_j}\right) dV \text{ for } j \in [1 \ldots R-1]$$

$$= \frac{1}{s^2} \int_\Omega \left(h*\sum_{i=1}^R \chi_i \cdot c_i - g\right)\left(h*\sum_{i=1}^R \frac{\partial \chi_i}{\partial \phi_j} \cdot c_i\right) dV \text{ for }$$

$$j \in [1 \ldots R-1]$$

The energy functional is minimized using a gradient descent approach that moves each $\phi$ toward the local minimum of E at every point in space simultaneously and independently. Within each iteration, the signed distance property of the level set functions is relaxed until reinitialization after the iteration and thus the integral disappears.

Biological Term

This term examines the structure and tissue characteristics of the plaque itself. As previously described, the normalized plaque coordinate system enables one to compare plaque structure and tissue characteristics between a given patient and the model trained from the histology-proven database. Thus, we treat the normalized plaque coordinates of each pixel as observed variables.

$$P(e_{biol} | M) = f(r, w | M) = \sum_i \chi_i f(r, w | A = a_i)$$

$$\frac{P(e_{biol} | M)}{P(e_{biol})} = K_{biol} \cdot f(r, w | M)$$

$$E_{biol} = -\int_\Omega [\ln f(r, w | M) - \ln K_{biol}] dV$$

$$= -\int_\Omega \left[ \ln \sum_i \chi_i f(r, w | A = a_i) - \ln K_{biol} \right] dV$$

$$\frac{\partial E_{biol}}{\partial \phi_j} = -\int_\Omega \left[ \frac{\sum_i \frac{\partial \chi_i}{\partial \phi_j} f(r, w | A = a_i)}{\sum_i \chi_i f(r, w | A = a_i)} \right] dV$$

Model Prior

Finally, in order to apply a Bayesian framework, one may advantageously apply a term that represents the prior probability of a given model configuration. The prior probability of the model depends on the smoothness of the contours as follows.

This can be expressed in terms of the three model component categories, the tissue characteristic region boundaries, the true deblurred tissue characteristic image intensities, and the scanner blur. In example embodiments, a very reasonable independence assumption may be made that these variables do not have interdepend upon each other. Furthermore, in some embodiments, the prior probability of the regions may be split up into the a priori probability of a pixel belonging to a given tissue characteristic class and the a priori smoothness of the boundary, represented with curvature.

The prior probability of the model configuration can be split into three terms, (1) the tissue characteristic prior probability, (2) the curvature prior probability, and (3) the tissue characteristic image intensity prior probability. The tissue characteristic prior probability at a given pixel is simply the weighted average of the tissue characteristic category priors weighted by the characteristic functions.

$$P(M) = P(\phi_1, \ldots, \phi_{R-1}) \cdot P(c_1, \ldots, c_R)$$
$$= P_a(\phi_1, \ldots, \phi_{R-1}) \cdot P_\kappa(\phi_1, \ldots, \phi_{R-1}) \cdot P(c_1, \ldots, c_R)$$

$$P_a(\phi_1, \ldots, \phi_{R-1}) = \sum_i \chi_i P(A = a_i)$$

$$E_a = -\int_\Omega \ln \sum_i \chi_i P(A = a_i) dV$$

$$\frac{\partial E_a}{\partial \phi_j} = -\int_\Omega \frac{\sum_i \frac{\partial \chi_i}{\partial \phi_j} P(A = a_i)}{\sum_i \chi_i P(A = a_i)} dV$$

The curvature prior probability is defined using an exponential distribution over the gradient magnitude of the characteristic functions. This places decreasing likelihood on high curvature sections of the contour since natural contours will generally be smooth. Note that in some embodiments, an additional modification to this term may be made in order to avoid the problem of curvature evolution trending toward disappearing contours, especially for small contours, as we often encounter with vascular tissue characteristics. The adjustment uses the offset appropriate for volume preserving flows, which subtracts the mean (over each contour) sum of curvatures of the contour from the computed sum of curvatures at each point. Note that the divergence of the normals produces a sum of curvatures in 3D rather than mean curvature as incorrectly noted in much of the level set literature. The mean sum of curvatures is recomputed at each iteration.

$$P(M) = P_\kappa(\phi_1, \ldots, \phi_{R-1}) = \prod_i P_K(K = |\nabla \chi_i|) = \prod_i \frac{1}{Z_K} e^{-\lambda |\nabla \chi_i|}$$

$$E_{prior} = -\int_\Omega \ln \prod_i \frac{1}{Z_K} e^{-\lambda |\nabla \chi_i|} dV = \int_\Omega \sum_i [\lambda |\nabla \chi_i| + \ln Z_K] dV$$

$$\frac{\partial E_{prior}}{\partial \phi_j} = \lambda \int_\Omega \sum_i \kappa_i \frac{\partial \chi_i}{\partial \phi_j} dV \quad \kappa_i = div\left(\frac{\nabla \chi_i}{|\nabla \chi_i|}\right) \text{ (sum of curvatures)}$$

$$\frac{\partial \bar{E}_{prior}}{\partial \phi_j} = \lambda \int_\Omega \sum_i (\kappa_i - \bar{\kappa}_i) \frac{\partial \chi_i}{\partial \phi_j} dV \quad \bar{\kappa}_i =$$

$$\frac{\int \delta_\varepsilon(-\chi_i) div\left(\frac{\nabla \chi_i}{|\nabla \chi_i|}\right) dV}{\int \delta_\varepsilon(-\chi_i) dV} \text{ (mean sum of curvatures)}$$

$$P_\kappa(\phi_1, \ldots, \phi_{R-1}) = \prod_i P_K(K = |\nabla \chi_i|) = \prod_i \frac{1}{Z_K} e^{-\lambda |\nabla \chi_i|}$$

$$E_\kappa = -\int_\Omega \ln \prod_i \frac{1}{Z_K} e^{-\lambda |\nabla \chi_i|} dV = \int_\Omega \sum_i [\lambda |\nabla \chi_i| + \ln Z_K] dV$$

$$\frac{\partial E_\kappa}{\partial \phi_j} = \lambda \int_\Omega \sum_i \kappa_i \frac{\partial \chi_i}{\partial \phi_j} dV \quad \kappa_i = div\left(\frac{\nabla \chi_i}{|\nabla \chi_i|}\right) \text{ (sum of curvatures)}$$

$$\frac{\partial \bar{E}_\kappa}{\partial \phi_j} = \lambda \int_\Omega \sum_i (\kappa_i - \bar{\kappa}_i) \frac{\partial \chi_i}{\partial \phi_j} dV \quad \bar{\kappa}_i =$$

$$\frac{\int \delta_\varepsilon(-\chi_i) div\left(\frac{\nabla \chi_i}{|\nabla \chi_i|}\right) dV}{\int \delta_\varepsilon(-\chi_i) dV} \text{ (mean sum of curvatures)}$$

Finally, the tissue characteristic image intensity constants and the PSF width may be assigned a mostly flat distribution in order to constrain their range and, in the case of the intensity constants, their relative ordering. This is done in order to constrain but not otherwise influence their value. The distribution chosen is the generalized normal distribution with $\beta \sim 8$. The distribution may be chosen to have infinite support so that if the value does stray outside of the expected range during iterations, it may return.

$$P(c_1, \ldots, c_R) =$$

$$\prod_i P(c_i) = \prod_i \frac{\beta_i}{2\alpha_i \Gamma(1/\beta_i)} e^{-\left(\frac{|c_i - \mu_i|}{\alpha_i}\right)^{\beta_i}} \text{ where expected range} =$$

$$[\mu_i - \alpha_i, \mu_i + \alpha_i]$$

$$E_c = -\ln P(c_1, \ldots, c_R) = -\sum_i \ln P(c_i)$$

$$= \sum_i \left[ \left(\frac{|c_i - \mu_i|}{\alpha_i}\right)^{\beta_i} - \ln\left(\frac{\beta_i}{2\alpha_i \Gamma(1/\beta_i)}\right) \right]$$

$$\frac{\partial E_c}{\partial c_j} = \frac{\beta_j}{\alpha_j^2} (c_j - \mu_j) \left(\frac{|c_j - \mu_j|}{\alpha_j}\right)^{\beta_j - 2}$$

-continued $$P(\sigma) = \frac{\beta_\sigma}{2\alpha_\sigma \Gamma(1/\beta_\sigma)} e^{-\left(\frac{|\sigma-\mu_\sigma|}{\alpha_\sigma}\right)^{\beta_\sigma}}$$

where expected range = $[\mu_\sigma - \alpha_\sigma, \mu_\sigma + \alpha_\sigma]$ $$E_\sigma = -\ln P(\sigma)$$

$$= \left(\frac{|\sigma-\mu_\sigma|}{\alpha_\sigma}\right)^{\beta_\sigma} - \ln\left(\frac{\beta_\sigma}{2\alpha_\sigma\Gamma(1/\beta_\sigma)}\right)$$

$$\frac{\partial E_c}{\partial \sigma} = \frac{\beta_\sigma}{\alpha_\sigma^2}(\sigma-\mu_\sigma)\left(\frac{|\sigma-\mu_\sigma|}{\alpha_\sigma}\right)^{\beta_\sigma - 2}$$

Computing Volume Fractions

The characteristic functions $\chi_i$ represent the partial volume occupancy for each analyte type at each pixel. However, due to the sub-pixel nature of the area calculations, the regularization blur incurred by each $\chi_i$ creates undesirable imprecision. Because of possible overlapping level sets, in some instance, one might not simply take $\phi_j$ as the region's signed distance. Instead the overlapping criteria of the multi-region level set may be taken into account.

$$s_j = \text{reinitialize}(\max(\phi_j, -\phi_{j-1}, -\phi_{j-2}, \ldots))$$

Then, this signed distance function is converted into a volume fraction by modeling the voxel as a sphere with diameter equal to the voxel diagonal and modeling the local surface as a plane at that signed distance value away from the center. The formula below comes from integrating the volume of a sphere of radius r from $-\infty$ to s.

$$r = \frac{\sqrt{\Delta x^2 + \Delta y^2 + \Delta z^2}}{2}$$

$$v_{frac} = \begin{cases} 1 & \text{if } s_j \leq -r \\ 0 & \text{if } s_j \geq r \\ \frac{2r^3 - 3r^2 s_j + s_j^3}{4r^3} & \text{otherwise} \end{cases}$$

Notably, unlike conventional deconvolution techniques, an advantageous approach is disclosed which may be highly selective in the image restoration step. In particular, The corrections to the image, (h*f−f), may be low frequency in that they are simply step edges blurred by a Gaussian thereby preventing erroneous amplification of high frequency noise, which may often occur with conventional deconvolution techniques that never fully separate amplifying true image structure from amplifying image noise. In fact the error of this improved deconvolution process is only subject to the accuracy of the region image intensity constants, the location of the edges, and the imaging system blur, all of which are highly intuitive and can easily be visually confirmed by the end user.

LRNC

The algorithm operates in two phases, first the deblurring and identification of high-contrast bright regions (lumen, CALC). While some embodiments, regions may be added due to other intensities (e.g., LRNC and IPH), a more robust approach of simply performing a sub-pixel thresholding on the deblurred image $I_{deblurred}$ as follows with $T_{LRNC}=45$ HU may be preferable.

$$S_{LRNC} = \text{reinitialize}(I_{deblurred} - T_{LRNC})$$

Dataset feedback has shown that a significant source of false positive LRNC signal comes from non-vascular adipose tissue that either is included within the vessel wall segmentation or is close enough so that its negative blur region encroaches into the vessel wall segmentation. To account for this the algorithm may advantageously mask the LRNC detections to 0.5 mm inside the outer wall boundary.

In example embodiments, a second pass at low-contrast regions (MATX, IPH) may follow. May be done since the bloom of the high-contrast regions may cause too much artifact to create a good initialization of the MATX and IPH regions. However, by identifying the initial MATX and IPH from the deblurred output image of the first stage, these regions can be much more reliably identified and used for the second phase.

Computer Implementation

Various embodiments of the above-described systems and methods may be implemented in digital electronic circuitry, in computer hardware, firmware, and/or software. The implementation can be as a computer program product (i.e., a computer program tangibly embodied in an information carrier). The implementation can, for example, be in a machine-readable non-transitory storage medium for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the techniques/algorithms disclosed herein by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). The mobile computing device includes, for example, a Blackberry®, iPAD®, iPhone® or other smartphone device.

REFERENCES

The following references are relevant to the deblurring/segmentation techniques described herein and are hereby incorporated by reference herein.

1. Zavodni, A. E. H., et al., *Carotid Artery Plaque Morphology and Composition in Relation to Incident Cardiovascular Events: The Multi-Ethnic Study of Atherosclerosis (MESA)*. Radiology, 2014. 271(2): p. 381-389.
2. Varma, N., et al., *Coronary Vessel Wall Contrast Enhancement Imaging as a Potential Direct Marker of Coronary Involvement Integration of Findings From CAD and SLE Patients*. JACC: Cardiovascular Imaging, 2014. 7(8): p. 762-770.
3. Kerwin, W. S., et al., *MRI of Carotid Atherosclerosis*. American Journal of Roentgenology, 2013. 200(3): p. W304-W313.
4. Bourque, J. M., et al., *Usefulness of Cardiovascular Magnetic Resonance Imaging of the Superficial Femoral Artery for Screening Patients With Diabetes Mellitus for Atherosclerosis*. Am J Cardiol, 2012. 110(1): p. 50-56.
5. Horie, N., et al., *Assessment of Carotid Plaque Stability Based on the Dynamic Enhancement Pattern in Plaque Components With Multidetector CT Angiography*. Stroke, 2012. 43(2): p. 393-398.
6. ten Kate, G. L., et al., *Noninvasive Imaging of the Vulnerable Atherosclerotic Plaque*. Current problems in cardiology, 2010. 35(11): p. 556-591.
7. Wintermark, M., et al., *High-Resolution CT Imaging of Carotid Artery Atherosclerotic Plaques*. American Journal of Neuroradiology, 2008. 29(5): p. 875-882.
8. Wintermark, M., et al., *Carotid Plaque CT Imaging in Stroke and Non-Stroke Patients*. Annals of neurology, 2008. 64(2): p. 149-157.
9. de Weert, T. T., et al., *In Vivo Characterization and Quantification of Atherosclerotic Carotid Plaque Components With Multidetector Computed Tomography and Histopathological Correlation*. Arterioscler Thromb Vasc Biol, 2006. 26(10): p. 2366-2372.
10. contributors, W. *Deblurring*. 2016 [cited 2016 8 Aug. 2016]; Available from: https://en.wikipedia.org/w/index.php?title=Deblurring&oldid=730987300.
11. contributors, W. *Point Spread Function*. 2007 11 Dec. 2007 [cited 2016 8 Aug. 2016]; Available from: https://en.wikipedia.org/w/index.php?title=Point_Spread_Function&oldid=177202733.
12. contributors, W. *Additive white Gaussian noise*. 2016 24 Jan. 2016 [cited 2016 16 Aug. 2016]; Available from: https://en.wikipedia.org/w/index.php?title=Additive_white_Gaussian_noise&oldid=701472993.
13. contributors, W. *Least squares*. 2016 7 Aug. 2016 [cited 2016 8 Aug. 2016]; Available from: https://en.wikipedia.org/w/index.php?title=Least_squares&oldid=733359578.
14. contributors, W. *Singular value decomposition*. 2016 7 Aug. 2016 [cited 2016 8 Aug. 2016]; Available from: https://en.wikipedia.org/w/index.php?title=Singular_value_decomposition&oldid=733321128.
15. contributors, W. *Tikhonov regularization*. 2016 16 Jul. 2016 [cited 2016 8 Aug. 2016]; Available from: https://en.wikipedia.org/w/index.php?title=Tikhonov_regularization&oldid=730044991.

16. contributors, W. *Deconvolution.* 2016 7 Jun. 2016 [cited 2016 8 Aug. 2016]; Available from: https://en.wikipedia.org/w/index.php?title=Deconvolution& oldid=724110149.
17. contributors, W. *Wiener deconvolution.* 2016 19 Jan. 2016 [cited 2016 8 Aug. 2016]; Available from: https://en.wikipedia.org/w/index.php?title=Wiener_deconvolution&oldid=700573288.
18. contributors, W. *Richardson-Lucy deconvolution.* 2016 17 Jul. 2016 [cited 2016 8 Aug. 2016]; Available from: https://en.wikipedia.org/w/index.php?title=Richardson%E2%80%93Lucy_deconvolution&oldid=730248790.
19. Chan, T. F. and L. A. Vese, *Active contours without edges*. IEEE Trans Image Process, 2001. 10(2): p. 266-77.
20. contributors, W. *Mumford Shah functional.* 2014 14 Dec. 2014 [cited 2016 8 Aug. 2016]; Available from: https://en.wikipedia.org/w/index.php?title=Mumford_Shah_functional&oldid=637995874.
21. contributors, W. *Heaviside step function.* 2016 19 Apr. 2016 [cited 2016 8 Aug. 2016]; Available from: https://en.wikipedia.org/w/index.php?title=Heaviside_step_function&oldid=715960250.
22. contributors, W. *Dirac delta function.* 2016 19 Jul. 2016 [cited 2016 8 Aug. 2016]; Available from: https://en.wikipedia.org/w/index.php?title=Dirac_delta_function&oldid=730533155.
23. contributors, W. *Euler-Lagrange equation.* 2016 27 Jun. 2016 [cited 2016 8 Aug. 2016]; Available from: https://en.wikipedia.org/w/index.php?title=Euler%E2%80%93Lagrange_equation&oldid=727161354.
24. Kim, J., Andy Tsai, Müjdat Cetin, and Alan S. Willsky, *A curve evolution-based variational approach to simultaneous image restoration and segmentation*, in 2002 International Conference on Image Processing. 2002, IEEE. p. 1-109.
25. Bar, L., N. Sochen, and N. Kiryati, *Semi-blind image restoration via Mumford-Shah regularization.* IEEE Trans Image Process, 2006. 15(2): p. 483-93.
26. Smith, B., Ahmed Saad, Ghassan Hamarneh, and Torsten Möller, *Recovery of dynamic PET regions via simultaneous segmentation and deconvolution*, in MICCAI Workshop on Analysis of Functional Medical Image Data (MICCAI functional). 2008. p. 33-40.
27. Kallel, M., Rajae Aboulaich, Abderrahmane Habbal, and Maher Moakher, *A Nash-game approach to joint image restoration and segmentation. Applied Mathematical Modelling,* 2014. 38(11): p. *Applied Mathematical Modelling.*
28. contributors, W. *Bayesian framework.* Meta-analysis 2016 7 Aug. 2016 [cited 2016 8 Aug. 2016]; Available from: https://en.wikipedia.org/w/index.php?title=Meta-analysis&oldid=733410444.
29. Mansouri, A.-R., A. Mitiche, and C. Vázquez, Multiregion competition: *A level set extension of region competition to multiple region image partitioning. Computer Vision and Image Understanding,* 2006. 101(3): p. 137-150.
30. contributors, W. *Kronecker delta.* 2016 28 Jul. 2016 [cited 2016 8 Aug. 2016]; Available from: https://en.wikipedia.org/w/index.php?title=Kronecker_delta&oldid=731967702.
31. contributors, W. *Naive Bayes classifier.* 2016 4 Jul. 2016 [cited 2016 8 Aug. 2016]; Available from: https://en.wikipedia.org/w/index.php?title=Naive_Bayes_classifier&oldid=728314243.
32. contributors, W. *Deriche edge detector.* 2015 5 Jan. 2015 [cited 2016 8 Aug. 2016]; Available from: https://en.wikipedia.org/w/index.php?title=Deriche_edge_detector&oldid=641111079.

The invention claimed is:

1. A computer-implemented method for deblurring an image including one or more analyte image regions, the method comprising:
using an imaging device to acquire a measured image g;
initializing a tissue characteristics image model representing a true underlying image f;
iteratively adjusting the tissue characteristics image model in order to minimize an energy function which models imaging physics relating to the appearance of different analytes in a Bayesian framework; and
outputting a deblurred image, wherein the deblured image is determined based on applying a transform to the measured image g, wherein the transform is determined based offsets between an optimized underlying image f and a blurred version of f convolved with a point spread function (PSF) of the imaging device.

2. The method of claim 1, wherein the tissue characteristics image model provides a partitioning scheme for multiphase level sets where analyte image regions are defined by characteristic functions $\chi$ as a function of level set functions $\phi$ for each tissue characteristic type.

3. A computer-implemented method for deblurring an image including one or more analyte image regions, the method comprising:
using an imaging device to acquire a measured image g;
initializing a tissue characteristics image model representing a true underlying image f;
iteratively adjusting the tissue characteristics image model in order to minimize an energy function which models imaging physics relating to the appearance of different analytes in a Bayesian framework; and
outputting a deblurred image;
wherein the tissue characteristics image model provides a partitioning scheme for multi-phase level sets where analyte image regions are defined by characteristic functions $\chi$ as a function of level set functions $\phi$ for each tissue characteristic type; and
wherein iteratively adjusting the tissue characteristics image model includes:
computing the characteristic functions from the level set functions for the current iteration;
computing blurred characteristic functions based on a IIR Gaussian blurring given a point spread function (PSF) for the imaging device;
computing image intensity constants for the blurred characteristic functions; and
computing level set updates based on a gradient descent approach to minimize the energy function.

4. The method of claim 3, wherein the tissue characteristic model is piecewise smooth and piecewise constant true underlying unblurred imaging intensity.

5. The method of claim 3, wherein the partitioning scheme for multi-phase level sets is selected so that every point within the domain belongs to one and only one region.

6. The method of claim 5, wherein each characteristic function is defined to be disjointed relative to the other characteristic functions to avoid overlap.

7. The method of claim 5, wherein one of the characteristic functions defines a background image region disjointed to all other characteristic functions.

8. The method of claim 3, wherein the characteristic functions are spatially regularized.

9. The method of claim 8, wherein the characteristic functions are spatially regularized using Gaussian-based regularization.

10. The method of claim 3, wherein deblurring and segmentation is performed for analytes representing high-contrast bright regions.

11. The method of claim 3, wherein the energy function is the negative log of probabilities for the Bayesian framework integrated over the image.

12. The method of claim 3, wherein the energy function includes an imaging physics component.

13. The method of claim 12, wherein the imaging physics component of the energy function accounts for image intensities and the point spread function (PSF) of the imaging device.

14. The method of claim 3, wherein the energy function includes a prior probability component.

15. The method of claim 14, wherein the prior probability component weights the model toward the most likely configurations from prior distribution and away from physically and biologically unrealistic solutions.

16. The method of claim 3, wherein the energy function includes a biological component.

17. The method of claim 3, further including initializing the measured image g with the background region masked to a constant intensity.

18. A computer-implemented method for deblurring an image including one or more analyte image regions, the method comprising:
using an imaging device to acquire a measured image g;
initializing a tissue characteristics image model representing a true underlying image f;
iteratively adjusting the tissue characteristics image model in order to minimize an energy function which models imaging physics relating to the appearance of different analytes in a Bayesian framework; and
outputting a deblurred image;
wherein the tissue characteristics image model provides a partitioning scheme for multi-phase level sets where analyte image regions are defined by characteristic functions $\chi$ as a function of level set functions $\phi$ for each tissue characteristic type;
wherein the image is of a vascular or pulmonary vessel, wherein the level set functions include a first level set for the vessel lumen and each contiguous region representing an analyte is initialized as its own level set; and
wherein at least one of (i) the analyte regions represent calcification regions or (ii) the analyte regions further include lipid-rich necrotic core (LRNC) and intra-plaque hemorrhage (IPH).

19. The method of claim 18, wherein candidate analyte regions are evaluated using a morphological watershed applied to an inverted image.

20. The method of claim 18, wherein the analyte regions represent calcification regions.

21. The method of claim 18, wherein the analyte regions further include lipid-rich necrotic core (LRNC) and intra-plaque hemorrhage (IPH).

22. A computer-implemented method for deblurring an image including one or more analyte image regions, the method comprising:
using an imaging device to acquire a measured image g;
initializing a tissue characteristics image model representing a true underlying image f;
iteratively adjusting the tissue characteristics image model in order to minimize an energy function which models imaging physics relating to the appearance of different analytes in a Bayesian framework; and
outputting a deblurred image;
wherein the tissue characteristics image model provides a partitioning scheme for multi-phase level sets where analyte image regions are defined by characteristic functions $\chi$ as a function of level set functions $\phi$ for each tissue characteristic type;
wherein the image is of a vascular or pulmonary vessel, wherein the level set functions include a first level set for the vessel lumen and each contiguous region representing an analyte is initialized as its own level set;
wherein candidate analyte regions are evaluated using a morphological watershed applied to an inverted image; and
wherein an upper range (percentile) value within each region in the watershed image is computed and a per-region threshold is determined as between the upper range percentile value and a value for the image background.

23. The method of claim 22, wherein basins less than a threshold of hydrologic units deep are merged with neighboring regions.

24. The method of claim 22, wherein the watershed image is masked to eliminate pixels below a watershed threshold.

25. The method of claim 22, wherein the per-region threshold is greater than a watershed threshold applied to mask the image.

26. The method of claim 22, wherein the per-region threshold is applied to threshold the image and the image is reinitialized as a signed distance function.

27. A computer-implemented method for deblurring an image including one or more analyte image regions, the method comprising:
using an imaging device to acquire a measured image g;
initializing a tissue characteristics image model representing a true underlying image f;
iteratively adjusting the tissue characteristics image model in order to minimize an energy function which models imaging physics relating to the appearance of different analytes in a Bayesian framework; and
outputting a deblurred image;
wherein deblurring and segmentation is performed for analytes representing high-contrast bright regions, the method further comprising sub-pixel thresholding on the deblurred image and a second pass deblurring and segmentation and segmentation of low-contrast regions.

28. The method of claim 27, wherein the low-contrast regions include an extracellular matrix (MATX), and intra-plaque hemorrhage (IPH).

29. A computer-implemented method for deblurring an image including one or more analyte image regions, the method comprising:
using an imaging device to acquire a measured image g;
initializing a tissue characteristics image model representing a true underlying image f;
iteratively adjusting the tissue characteristics image model in order to minimize an energy function which models imaging physics relating to the appearance of different analytes in a Bayesian framework; and
outputting a deblurred image;
wherein the energy function includes a prior probability component;

wherein the prior probability component weights the model toward the most likely configurations from prior distribution and away from physically and biologically unrealistic solutions; and wherein prior probability is modeled with respect to tissue characteristic region boundaries, true deblurred tissue characteristic image intensities, and scanner blur.

30. The method of claim 29, wherein prior probabilities for the tissue characteristic region boundaries, the true deblurred tissue characteristic image intensities, and the scanner blur are independent of one another.

31. A computer-implemented method for deblurring an image including one or more analyte image regions, the method comprising:

using an imaging device to acquire a measured image g;
initializing a tissue characteristics image model representing a true underlying image f;
iteratively adjusting the tissue characteristics image model in order to minimize an energy function which models imaging physics relating to the appearance of different analytes in a Bayesian framework; and
outputting a deblurred image;
wherein the energy function includes a prior probability component; and
wherein the prior probability component models a priori probability of each pixel belonging to a given tissue characteristic class and a priori smoothness of the boundary, represented with curvature.

32. A computer-implemented method for deblurring an image including one or more analyte image regions, the method comprising:

using an imaging device to acquire a measured image g;
initializing a tissue characteristics image model representing a true underlying image f;
iteratively adjusting the tissue characteristics image model in order to minimize an energy function which models imaging physics relating to the appearance of different analytes in a Bayesian framework; and
outputting a deblurred image;
wherein the energy function includes a prior probability component; and
wherein the prior probability component models (i) tissue characteristic prior probability, (ii) curvature prior probability, and (iii) the tissue characteristic image intensity prior probability.

33. The method of claim 32, wherein the tissue characteristics image model provides a partitioning scheme for multi-phase level sets where analyte image regions are defined by characteristic functions $\chi$ as a function of level set functions $\phi$ for each tissue characteristic type and wherein the tissue characteristic prior probability at a given pixel is a weighted average of the tissue characteristic category priors weighted by characteristic functions for the for the tissue characteristics image model.

34. The method of claim 32, wherein the tissue characteristics image model provides a partitioning scheme for multi-phase level sets where analyte image regions are defined by characteristic functions $\chi$ as a function of level set functions $\phi$ for each tissue characteristic type and wherein the curvature prior probability is defined using an exponential distribution over a gradient magnitude of the characteristic functions.

35. The method of claim 34, wherein the curvature prior probability uses an offset appropriate for volume preserving flows, which subtracts the mean (over each contour) sum of curvatures of the contour from the computed sum of curvatures at each point.

36. The method of claim 32, wherein the tissue characteristic image intensity prior probability constants and point spread function (PSF) width is assigned a flat distribution in order to constrain their range and, in the case of the intensity constants, their relative ordering.

37. The method of claim 36, wherein the flat distribution is chosen to have infinite support so that if the value does stray outside of the expected range during iterations, it may return.

38. A computer-implemented method for deblurring an image including one or more analyte image regions, the method comprising:

using an imaging device to acquire a measured image g;
initializing a tissue characteristics image model representing a true underlying image f;
iteratively adjusting the tissue characteristics image model in order to minimize an energy function which models imaging physics relating to the appearance of different analytes in a Bayesian framework; and
outputting a deblurred image;
wherein the energy function includes a biological component; and
wherein the biological portion of the model incorporates histology-driven knowledge of the structure and growth patterns of analytes.

39. A computer-implemented method for deblurring an image including one or more analyte image regions, the method comprising:

using an imaging device to acquire a measured image g;
initializing a tissue characteristics image model representing a true underlying image f, wherein the tissue characteristics image model provides a partitioning scheme for multi-phase level sets where analyte image regions are defined by characteristic functions $\chi$ as a function of level set functions $\phi$ for each tissue characteristic type;
computing volume fraction from characteristic functions;
iteratively adjusting the tissue characteristics image model in order to minimize an energy function which models imaging physics relating to the appearance of different analytes in a Bayesian framework; and
outputting a deblurred image.

40. A system for implementing the computer-implemented method of claim 3 the system comprising:

a processor configured for executing processor executable steps stored on a non-transient processor readable medium, the steps including:
receiving the measured image g from the imaging device;
initializing the tissue characteristics image model representing the true underlying image f;
iteratively adjusting the tissue characteristics image model in order to minimize the energy function; and
outputting the deblurred image.

41. A system for implementing the computer-implemented method of claim 18 the system comprising:

a processor configured for executing processor executable steps stored on a non-transient processor readable medium, the steps including:
receiving the measured image g from the imaging device;
initializing the tissue characteristics image model representing the true underlying image f;
iteratively adjusting the tissue characteristics image model in order to minimize the energy function; and
outputting the deblurred image.

42. A system for implementing the computer-implemented method of claim 22 the system comprising:

a processor configured for executing processor executable steps stored on a non-transient processor readable medium, the steps including:

receiving the measured image g from the imaging device;

initializing the tissue characteristics image model representing the true underlying image f;

iteratively adjusting the tissue characteristics image model in order to minimize the energy function; and outputting the deblurred image.

43. A system for implementing the computer-implemented method of claim 24 the system comprising:

a processor configured for executing processor executable steps stored on a non-transient processor readable medium, the steps including:

receiving the measured image g from the imaging device;

initializing the tissue characteristics image model representing the true underlying image f;

iteratively adjusting the tissue characteristics image model in order to minimize the energy function; and outputting the deblurred image.

44. A system for implementing the computer-implemented method of claim 29 the system comprising:

a processor configured for executing processor executable steps stored on a non-transient processor readable medium, the steps including:

receiving the measured image g from the imaging device;

initializing the tissue characteristics image model representing the true underlying image f;

iteratively adjusting the tissue characteristics image model in order to minimize the energy function; and outputting the deblurred image.

45. A system for implementing the computer-implemented method of claim 31 the system comprising:

a processor configured for executing processor executable steps stored on a non-transient processor readable medium, the steps including:

receiving the measured image g from the imaging device initializing the tissue characteristics image model representing the true underlying image f;

iteratively adjusting the tissue characteristics image model in order to minimize the energy function; and outputting the deblurred image.

46. A system for implementing the computer-implemented method of claim 32 the system comprising:

a processor configured for executing processor executable steps stored on a non-transient processor readable medium, the steps including:

receiving the measured image g from the imaging device;

initializing the tissue characteristics image model representing the true underlying image f;

iteratively adjusting the tissue characteristics image model in order to minimize the energy function; and outputting the deblurred image.

47. A system for implementing the computer-implemented method of claim 38 the system comprising:

a processor configured for executing processor executable steps stored on a non-transient processor readable medium, the steps including:

receiving the measured image g from the imaging device;

initializing the tissue characteristics image model representing the true underlying image f;

iteratively adjusting the tissue characteristics image model in order to minimize the energy function; and outputting the deblurred image.

48. A system for implementing the computer-implemented method of claim 39 the system comprising:

a processor configured for executing processor executable steps stored on a non-transient processor readable medium, the steps including:

receiving the measured image g from the imaging device;

initializing the tissue characteristics image model representing the true underlying image f;

iteratively adjusting the tissue characteristics image model in order to minimize the energy function; and outputting the deblurred image.

49. A system for implementing the computer-implemented method of claim 1 the system comprising:

a processor configured for executing processor executable steps stored on a non-transient processor readable medium, the steps including:

receiving the measured image g from the imaging device;

initializing the tissue characteristics image model representing the true underlying image f;

iteratively adjusting the tissue characteristics image model in order to minimize the energy function; and outputting the deblurred image.

* * * * *

UNITED STATES PATENT AND TRADEMARK OFFICE
CERTIFICATE OF CORRECTION

| | |
|---|---|
| PATENT NO. | : 10,740,880 B2 |
| APPLICATION NO. | : 15/874474 |
| DATED | : August 11, 2020 |
| INVENTOR(S) | : David S. Paik et al. |

It is certified that error appears in the above-identified patent and that said Letters Patent is hereby corrected as shown below:

In the Specification

In Column 1, Line 18, insert the following:
--GOVERNMENT RIGHTS IN THE INVENTION
This invention was in part made with government support under National Science Foundation SBIR Award 1248316 awarded by the National Science Foundation and National Institute of Health SBIR Award R44 HL126224 awarded by the National Institute of Health. The government may have certain rights in the invention.--

Signed and Sealed this
Twenty-fourth Day of January, 2023

Katherine Kelly Vidal
*Director of the United States Patent and Trademark Office*